US009524619B2

(12) United States Patent
Colvin et al.

(10) Patent No.: US 9,524,619 B2
(45) Date of Patent: Dec. 20, 2016

(54) SYSTEMS AND METHODS FOR PLAYING A WAGERING GAME

(71) Applicant: Z4 Poker, LLC, Las Vegas, NV (US)

(72) Inventors: Eric D. Colvin, Las Vegas, NV (US); Paul Zain, Las Vegas, NV (US); Matthew Joseph Kaufman, Las Vegas, NV (US); Tobias Block, Las Vegas, NV (US)

(73) Assignee: Z4 POKER, LLC, Las Vegas, NV (US)

( * ) Notice: Subject to any disclaimer, the term of this patent is extended or adjusted under 35 U.S.C. 154(b) by 163 days.

(21) Appl. No.: 14/173,682

(22) Filed: Feb. 5, 2014

(65) Prior Publication Data

US 2015/0221183 A1 Aug. 6, 2015

(51) Int. Cl.
*G06F 17/00* (2006.01)
*G07F 17/32* (2006.01)

(52) U.S. Cl.
CPC ....... *G07F 17/3293* (2013.01); *G07F 17/3244* (2013.01); *G07F 17/3272* (2013.01)

(58) Field of Classification Search
USPC ............................... 463/11–13; 273/292–294
See application file for complete search history.

(56) References Cited

U.S. PATENT DOCUMENTS

| | | | |
|---|---|---|---|
| 5,768,382 | A | 6/1998 | Schneier |
| 5,970,143 | A | 10/1999 | Schneier |
| 6,315,666 | B1 | 11/2001 | Mastera |
| 6,508,709 | B1 | 1/2003 | Karmarkar |
| 6,743,098 | B2 | 6/2004 | Urie |
| 6,979,264 | B2 | 12/2005 | Chatigny |
| 7,107,245 | B1 | 9/2006 | Kowalick |
| 7,362,862 | B2 | 4/2008 | Schneier |
| 7,416,186 | B2 | 8/2008 | Walker |
| 7,506,172 | B2 | 3/2009 | Bhakta |
| 7,524,243 | B2 | 4/2009 | Bansemer |
| 7,758,411 | B2 | 7/2010 | Crawford, III |
| 8,087,988 | B2 | 1/2012 | Nguyen |
| 8,159,328 | B2 | 4/2012 | Luckhardt |
| 8,197,321 | B2 | 6/2012 | Wolf |
| 8,243,929 | B2 | 8/2012 | Wells |
| 8,251,806 | B2 | 8/2012 | Chatigny |

(Continued)

FOREIGN PATENT DOCUMENTS

| | | |
|---|---|---|
| EP | 0903665 A2 | 3/1999 |
| EP | 1120757 A2 | 8/2001 |

(Continued)

*Primary Examiner* — Ronald Laneau
(74) *Attorney, Agent, or Firm* — Howard & Howard Attorneys PLLC

(57) ABSTRACT

Systems and methods enable one or more players to play a wagering game. A game system includes a game server configured to connect to at least one gaming device over a network. The game server includes a processor configured to provide at least one wagering game to a player using the gaming device. Each wagering game is played by a plurality of players at a virtual table who are dealt a plurality of cards to form a hand, and the hand satisfying a winning criterion is determined to be a winning hand. The game system also includes at least one non-relational database configured to be connected to the game server. The database is configured to store a state of the hands of each table as a plurality of document-oriented datasets.

120 Claims, 14 Drawing Sheets

(56) References Cited

U.S. PATENT DOCUMENTS

| | | | | |
|---|---|---|---|---|
| 8,257,174 | B2 | 9/2012 | Pincus | |
| 8,282,475 | B2 | 10/2012 | Nguyen | |
| 8,368,510 | B2 | 2/2013 | Lockhardt | |
| 8,480,494 | B2 | 7/2013 | Cantor | |
| 8,727,892 | B1 * | 5/2014 | Chun | G07F 17/3276 463/25 |
| 2002/0094869 | A1 | 7/2002 | Harkham | |
| 2002/0160834 | A1 | 10/2002 | Urie | |
| 2003/0131265 | A1 | 7/2003 | Bhakta | |
| 2004/0053692 | A1 | 3/2004 | Chatigny | |
| 2005/0173863 | A1 | 8/2005 | Walker | |
| 2006/0025213 | A1 | 2/2006 | Kane | |
| 2006/0058008 | A1 | 3/2006 | Choksi | |
| 2006/0068869 | A1 | 3/2006 | White | |
| 2006/0068879 | A1 | 3/2006 | Crawford, III | |
| 2006/0100012 | A1 | 5/2006 | Chatigny | |
| 2006/0121973 | A1 | 6/2006 | Parisien | |
| 2006/0131809 | A1 * | 6/2006 | Lancaster | G07F 17/32 273/292 |
| 2006/0178191 | A1 | 8/2006 | Ellis | |
| 2006/0205497 | A1 | 9/2006 | Wells | |
| 2006/0217199 | A1 | 9/2006 | Adcox | |
| 2007/0155460 | A1 | 7/2007 | Burnside | |
| 2007/0265049 | A1 | 11/2007 | Black | |
| 2008/0176618 | A1 | 7/2008 | Toompere | |
| 2008/0268931 | A1 | 10/2008 | Alderucci | |
| 2008/0318651 | A1 | 12/2008 | Gross | |
| 2009/0029766 | A1 | 1/2009 | Lutnick | |
| 2009/0036188 | A1 | 2/2009 | Gelman | |
| 2009/0093300 | A1 | 4/2009 | Lutnick | |
| 2009/0131151 | A1 * | 5/2009 | Harris | G07F 17/32 463/22 |
| 2009/0176565 | A1 | 7/2009 | Kelly | |
| 2009/0176566 | A1 | 7/2009 | Kelly | |
| 2009/0221367 | A1 | 9/2009 | Longley | |
| 2009/0291762 | A1 * | 11/2009 | Walker | G07F 17/32 463/42 |
| 2010/0013593 | A1 | 1/2010 | Luckhardt | |
| 2010/0048302 | A1 | 2/2010 | Lutnick | |
| 2010/0105460 | A1 * | 4/2010 | Makhoul | G07F 17/32 463/13 |
| 2010/0325009 | A1 | 12/2010 | Rajan | |
| 2011/0177863 | A1 | 7/2011 | Davidson | |
| 2011/0285499 | A1 | 11/2011 | Nakamachi | |
| 2012/0004037 | A1 * | 1/2012 | Hill | G07F 17/32 463/42 |
| 2012/0046110 | A1 | 2/2012 | Amaitis | |
| 2012/0122572 | A1 | 5/2012 | Kelly | |
| 2012/0122586 | A1 | 5/2012 | Kelly | |
| 2012/0122589 | A1 | 5/2012 | Kelly | |
| 2012/0218074 | A1 | 8/2012 | Luckhardt | |
| 2012/0270622 | A1 | 10/2012 | Pawloski | |
| 2012/0270639 | A1 | 10/2012 | Walker | |
| 2015/0141107 | A1 * | 5/2015 | Kowalski | G07F 17/3293 463/13 |

FOREIGN PATENT DOCUMENTS

| | | | |
|---|---|---|---|
| EP | 1746550 | A2 | 1/2007 |
| EP | 2360631 | A1 | 1/2010 |
| EP | 2360651 | A1 | 8/2011 |
| EP | 2393069 | A1 | 12/2011 |
| EP | 2405410 | A1 | 1/2012 |
| EP | 2437223 | A1 | 4/2012 |
| WO | WO0167231 | A2 | 9/2001 |
| WO | WO0182176 | A1 | 11/2001 |
| WO | WO0247042 | A1 | 6/2002 |
| WO | WO03058878 | A1 | 7/2003 |
| WO | WO2004024268 | A1 | 3/2004 |
| WO | WO2004025397 | A2 | 3/2004 |
| WO | WO2004059337 | A1 | 7/2004 |
| WO | WO2005082011 | A2 | 9/2005 |
| WO | WO2006014908 | A1 | 2/2006 |
| WO | WO2006084122 | A2 | 8/2006 |
| WO | WO2007008599 | A2 | 1/2007 |
| WO | WO2007029112 | A2 | 3/2007 |
| WO | WO2007040675 | A2 | 4/2007 |
| WO | WO2008016337 | A1 | 2/2008 |
| WO | WO2008016610 | A2 | 2/2008 |
| WO | WO2009032598 | A1 | 3/2009 |
| WO | WO2012067680 | A1 | 5/2012 |

* cited by examiner

SYSTEMS AND METHODS FOR PLAYING A WAGERING GAME

BACKGROUND

Embodiments of the present disclosure relate to systems and methods for playing online poker and other wagering games.

Poker is a card game in which a group of players are dealt one or more playing cards (sometimes referred to as "hole cards") to form a hand of cards. In some embodiments, the players may replace one or more of the dealt cards with newly dealt cards and/or with cards that are shared between the players (sometimes referred to as "community cards"). The players may place bets on the outcome of the game, and the bets are collected in a pot. The player or players with the highest ranked hand (or in some cases, the lowest ranked hand) wins the pot, or the pot may be split between the players with the lowest ranked hand and the highest ranked hand.

Online poker is a form of poker in which the game is provided over a network by one or more computers. The various components of the poker game, such as the table, the playing cards, the dealer, etc. are represented virtually by the computers. In addition, the players typically are represented virtually within the game by one or more avatars or icons, for example.

Some online poker players desire to play multiple online poker games at once (sometimes referred to as "multi-tabling"). The players typically will play on a plurality of tables provided by an online poker operator or website. In this manner, the players hope to increase the amount of money they may win over a period of time. However, many online poker operators or websites either do not allow players to multitable, or are not optimized for multitabling. Accordingly, the players desiring to multitable may experience inefficiencies in the multitable implementation and/or may not be able to play on the number or type of tables desired.

In addition, online poker websites may experience large fluctuations in the amount of players visiting the site. For example, some websites experience player fluctuations of up to 1000% between peak periods and non-peak periods. Such fluctuations may strain the computing resources required to provide the poker games to the players. Accordingly, at least some websites or online poker operators may be required to procure computing resources that are sufficient to meet an expected peak demand for the poker games. However, if the demand for the poker games drops (e.g., fewer players request to play games on the website), the computing resources may be underutilized leading to unnecessary expenditures to maintain the underutilized resources.

BRIEF SUMMARY

In one embodiment, a game system for providing one or more wagering games is disclosed that includes a game server configured to connect to at least one gaming device over a network. The game server includes a processor further configured to provide at least one wagering game to a player using the gaming device. Each wagering game is played by a plurality of players at a virtual table who are dealt a plurality of cards to form a hand, and the hand satisfying a winning criterion is determined to be a winning hand. The game system also includes at least one non-relational database configured to be connected to the game server. The database is further configured to store a state of the hands of each table as a plurality of document-oriented datasets.

In another embodiment, a method of providing one or more wagering games is disclosed. The method includes connecting at least one gaming device to a game server over a network, and providing, by the game server, at least one wagering game to a player using the gaming device. Each wagering game is played by a plurality of players at a virtual table who are dealt a plurality of cards to form a hand, and the hand satisfying a winning criterion is determined to be a winning hand. The method also includes connecting at least one non-relational database to the game server, and storing a state of the hands of each table as a plurality of document-oriented datasets within the non-relational database.

In yet another embodiment, a system for providing one or more wagering games is disclosed. The system includes a game system having a game server that includes at least one first processor configured to provide at least one wagering game to a player using the gaming device. Each wagering game is played by a plurality of players at a virtual table who are dealt a plurality of cards to form a hand, and the hand satisfying a winning criterion is determined to be a winning hand. The game system also includes at least one non-relational database configured to be connected to the game server. The database is further configured to store a state of the hands of each table as a plurality of document-oriented datasets. The system also includes a gaming device configured to connect to the game server over a network. The gaming device includes at least one second processor configured to enable the player to play the wagering game.

DETAILED DESCRIPTION

Figure 1:
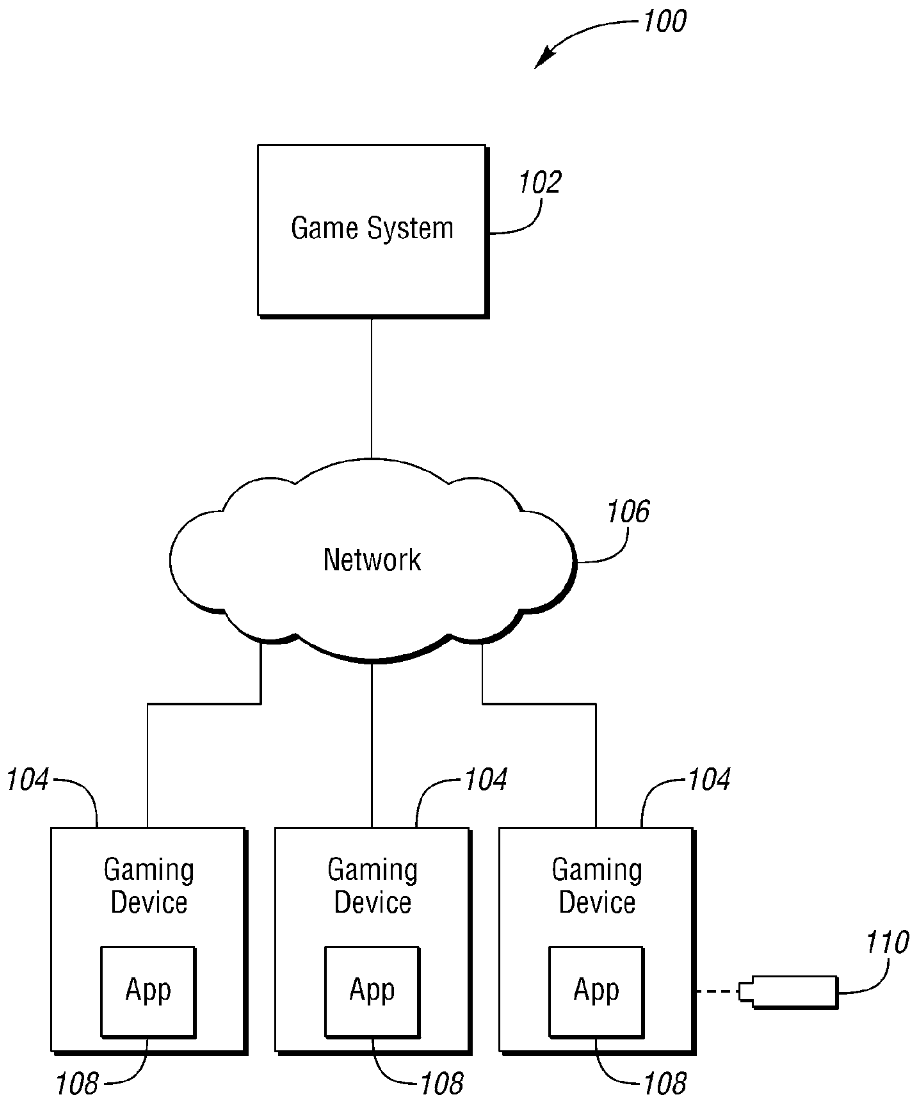
FIG. 1 is a block diagram of a system that may be used to play a wagering game.

Systems and methods for playing a wagering game are described herein. In one embodiment, the systems and methods enable one or more players to play a game of online poker. Alternatively, any suitable wagering game may be played using the systems and methods described herein.

In one embodiment of online poker, a player uses a gaming device to connect to a game system. The gaming device may be authenticated by the game system, and a game server within the game system may provide the poker game to the player through the gaming device. For example, the player may select one or more tables at which to play the game and the player may be virtually seated at the selected table. In one embodiment, an avatar representing the player may be seated at the table, and other competing players may also be virtually seated at the table through their respective avatars.

The player may select one or more widgets to enable the player to enhance the poker game experience. For example, the player may select a note-taking widget that enables the player to rank and/or take notes about one or more competitors at the table. The avatar of the competitor that the player ranked may be highlighted or otherwise marked according to the ranking given by the player. For example, the player may rank one or more competitors as "strong" players so that the respective avatars are highlighted or outlined in red, and may rank one or more competitors as "weak" players so that the respective avatars are highlighted or outlined in green. The above examples are merely for illustration, and it should be recognized that any suitable ranking and/or marking may be used as desired. In addition, any other suitable widget may be selected and used within the game.

The player may also choose to play on a plurality of poker tables at the same time (i.e., the player may multitable). In one embodiment, a plurality of tables that the player has selected to play are displayed in a queue of tables. The tables in the queue may be ordered and/or prioritized based on a priority of the action required to be taken at each table. In one embodiment, the priority of the action required to be taken is based on an amount of time remaining for the player to act at the table, such as by betting, calling, raising, checking, or folding. If the player acts at a table, the table may be re-positioned or moved to a lowest position or any other position of priority within the queue. It should be recognized that, in some embodiments, the player may enter an action out of turn at one or more tables in the queue, such as by selecting an icon or button to check or fold a hand. When it becomes the player's turn, the action entered out of turn is then automatically implemented.

In some embodiments, a state of the tables and/or the players' hands may be stored in a database, such as a non-relational database that stores document-oriented data. This allows the tables and the hands to be persistently stored in a flexible state within a database rather than within memory of the game server. In addition, if the game server becomes inaccessible or crashes, for example, the states of the tables and hands may be recoverable when the game server is restored. The number of tables provided by the game system may also be scaled efficiently using the non-relational database to accommodate increased or decreased player activity.

A technical effect of the systems and methods described herein includes one or more of: (a) connecting at least one gaming device to a game server over a network; (b) providing, by the game server, at least one wagering game to a player using the at least one gaming device, wherein each wagering game is played by a plurality of players at a virtual table who are dealt a plurality of cards to form a hand, and in which the hand satisfying a winning criterion is determined to be a winning hand; (c) connecting at least one non-relational database to the game server; and (d) storing a state of the hands of each table as a plurality of document-oriented datasets within the at least one non-relational database.

As used herein, a "wagering game" or "game" refers to an electronic game that is played by a player in which the player places one or more wagers on the outcome of the game to participate, or continue to participate, in the game. In addition, an outcome of the game is at least partially based on chance or a random selection of game components. For example, while poker is a wagering game that may be partially based on skill (e.g., determining a strength of a hand, strategically placing bets, and analyzing an opponent's gameplay or strategy), the outcome of the game may be at least partially based on a random selection of cards for the players' hands.

The terms "wager" and "bet" are used interchangeably herein to refer to an amount of money, credits, or other consideration placed on the outcome of a game. Wagers or bets may alternatively include "play money" or "free to play" credits or tokens that are not usable except to play one or more games and that have no inherent monetary value. The wagers from each of the players are placed into a "pot" or a "pool" that is typically awarded to the player who wins the hand or the round of the game.

One example of a wagering game that may be played according to embodiments of the present disclosure is online poker (also referred to as Internet poker). Online poker is a game of poker that is played by a plurality of players over a network, such as the Internet. Online poker games according to embodiments described herein may be hosted by a game server that accepts network connections from computing devices of players who want to play the game. Online poker games described herein may be played with players virtually displayed or seated around a virtual table using avatars representing the players. A plurality of poker tables may be virtually placed inside of a virtual poker room, and a plurality of rooms may be virtually placed inside of one or more virtual casinos. Further virtual constructs are possible as well, such as virtual gaming cities or jurisdictions, states, countries, continents, etc.

As used herein, the term "avatar" refers to a virtual representation of a player. For example, in a virtual poker game according to embodiments described herein, each player may select an avatar to represent the player, and the avatars may be positioned around a virtual poker table to represent that each player is seated at the table. Avatars may include likenesses of real people, caricatures, animals, symbols, designs, and/or any other suitable image. In some embodiments, an avatar may include a photograph or a video stream of an actual player, such as from a webcam of the player.

As used herein, the term "hand" refers to one or more cards that are dealt to a player in a card game, such as poker. The hand may include one or more cards that are dealt only to the player and that are kept hidden from other players (sometimes referred to as "hole cards") and may also include one or more cards that are dealt and revealed to all players for use in each player's hand (sometimes referred to as "community cards"). In some poker games, such as stud poker, one or more cards for each player's hand are dealt face up and are revealed to each other player at the table. In a typical game of poker, for example, a player's hand is made up of 5 cards, which may include all hole cards, all community cards, or a combination of hole cards and community cards. Depending on the context, the term "hand" may also refer to the completion of a round of the game in which each player's hands have been fully played or folded, for example.

A game session is a period of time between a time that a player or gaming device of the player logs in to a game server or other device providing the game and a time that the player logs out of the game server or other device providing the game.

As used herein, the term "table" refers to a virtual representation of a real poker table (or a table of another wagering game). Accordingly, in some embodiments, the virtual table may include a representation of a table top for displaying virtual community cards and/or chip stacks, representations of a plurality of chairs for the players or the players' avatars, and the like.

The term "blind" or "blinds" refers to a required bet that at least a portion of the players at a table must make at the beginning of a hand. For example, in a Texas Hold 'Em poker game, the first player to the left of the dealer position must automatically place a "small blind" bet and the second player to the left of the dealer position must automatically place a "big blind" bet (typically twice the size of the small blind) at the start of the hand. In some tournaments, the blinds may increase according to a predetermined sequence or rate as the tournament progresses. It should be recognized that antes (i.e., amounts that must be paid by each player to play a hand) may be used in place of, or in addition to, blinds based on the type of game being played.

A "rake" refers to an amount of money or credits (typically a predetermined percentage up to a predetermined maximum amount or cap) that is automatically taken out of the pot by the owner or operator of the game. For example, a rake may be between about 2% and about 5% of the amount of money in the pot up to a maximum of $50 in some embodiments. However, it should be recognized that any predetermined amount, percentage, and/or cap may be used for the rake.

Gaming devices and wagering games described herein may use real money for play of the games, or may utilize a credit-based system in which the credits used for the games do not have a cash value. Similarly, prizes for the games may be in the form of credits, cash, and/or physical prizes such as televisions, automobiles, or the like.

As used herein, a "widget" refers to an application or script that may be embedded within another application, script, website, or user interface. For example, a widget may be implemented and/or embedded within a website or user interface using HTML or JavaScript, or any other suitable programming language.

It should be recognized by those of ordinary skill in the art that the term "random" is not limited to true randomness, such as truly random numbers. Rather, pseudorandom numbers and pseudorandom algorithms are included within the meaning of "random."

As used herein, the term "the house" refers to a game operator or a gaming establishment operator. For example, if a game is operated within or by a casino, the casino may be referred to as the house.

As used herein, the terms "connect" and "couple" are not limited to only including direct connections. Rather, unless otherwise specified, indirect connections are included within the definitions of "connect" and "couple." For example, two devices may be considered to be connected together even if there are other devices or components connected between the two devices.

A player reward card refers to a physical or electronic card, token, or other device or data that enables a system to identify a player in connection with, among other things, a reward program or campaign. Accordingly, the player reward card may serve to identify the player and may enable game play, credits, funds, or other data to be associated with the player.

Methods described herein may be embodied within a plurality of computer-executable instructions stored within a memory device of a computing device. Moreover, a processor of the computing device, or of a computing device connected to the memory device, executes the instructions to perform the functions described herein and/or to cause the functions described herein to be performed. The instructions may be grouped together to form one or more non-transitory computer-readable program modules.

Computing devices typically include at least one processor and at least one memory device. The processor may be, without limitation, an x86-based logic circuit, an ARM-based logic circuit, and/or a system-on-a-chip circuit. It should be recognized that these examples are non-limiting, and a variety of other programmable circuits may be included within the definition of "processor." The memory device may include random access memory (RAM), flash memory, read-only memory (ROM), hard disk drives, magnetic-based memory, and/or any other non-transitory form of computer-readable memory.

A desktop computer is one example of a computing device. Other examples of computing devices include, without limitation, cell phones, tablets, PDAs, laptop computers, and server computers (or "servers"). It should be recognized that computers or computing devices may be implemented as one or more virtual machines, virtual servers, and/or any other virtual device.

FIG. 1 is a block diagram of a system 100 that may be used to execute the methods described herein to play one or more wagering games, such as online poker. The games may be played by a player against other players, or may be played by the player against the house.

System 100 includes a game system 102 connected to a plurality of gaming devices 104 by a network 106. While one game system 102, one network 106, and three gaming devices 104 are illustrated in FIG. 1, it should be recognized that system 100 may include any suitable number of game systems 102, networks 106, and/or gaming devices 104 that enables system 100 to operate as described herein.

Game system 102 is used to provide a wagering game, such as poker, to gaming devices 104. In one embodiment, game system 102 includes a plurality of server computers (or "servers") that are connected to gaming devices 104 through network 106. For example, at least one server of game system 102 may be a web server that enables gaming devices 104 to access a website in which the poker game is hosted.

In one embodiment, network 106 includes the Internet and/or one or more other networks, such as one or more private local area networks (LAN). Accordingly, while one network 106 is illustrated in FIG. 1, a plurality of interconnected networks may be used to connect gaming devices 104 and game system 102 together. In one embodiment, network

106 includes a mobile telecommunication network, such as a "3G" or a "4G" mobile network that enables one or more mobile gaming devices 104 (e.g., cellular phones) to communicate wirelessly with game system 102.

Gaming devices 104 may include, for example, cellular phones, tablet computing devices, laptop computers, desktop computers, gaming kiosks, electronic gaming machines (also known as "slot machines"), and/or any other suitable device. In one embodiment, a single player may use multiple gaming devices 104 to interact with a single game of poker, as described more fully herein.

Gaming devices 104 may execute at least one application 108 to connect to game system 102 and to present the game to the player on gaming device 104. In one embodiment, application 108 may include a web browser that enables the player to connect to a web site hosted by game system 102 for providing the game. In another embodiment, application 108 may be a downloaded application (or set of applications) that is specific to the wagering game and/or game system 102.

During operation, gaming devices 104 may open a network connection to game system 102 to participate in the game using application 108. Game system 102 transmits one or more web pages and/or other data representative of the game to gaming devices 104 to enable the players to play the game using gaming devices 104 as described more fully herein.

In one embodiment, a hardware token or dongle 110 may be connected to a gaming device 104 to provide authentication and/or location services to gaming device 104. For example, a player may connect token 110 to gaming device 104 to enable gaming device 104 to be authenticated (and the player identified) by game system 102 or another system and to enable game system 102 or another system to verify the location of gaming device 104.

In one embodiment, token 110 may be a portable USB device that provides accurate and reliable wireless geo-fencing services for regulated online gaming services tunable to meet or exceed a number of regulated player identity and geo-fencing use cases for both intrastate online gaming and indoor "curb-to-curb" casino wireless gaming. Token 110 may use event driven software, two factor authentication, and geospatial data analytics in concert to determine the identity, age, and/or location of the owner or player of gaming device 104, and to provide digital rights management necessary for gaming device 104 to comply with applicable regulations.

Player identity, or authentication services, may be managed by assigning one factor credentials (i.e., "something you know"), such as username and password, to digital certificates within a standard public key infrastructure (PKI) network while adding a second factor credential (i.e., "something you have") that requires token 110 to be physically connected to gaming device 104.

In one embodiment, token 110 may be an open standard, hardware token device that uses PKI security management services (e.g., RSA, Sentinel, etc.) leveraging a certificate authority (CA) to provide nonrepudiation of user identity. Token 110 may connect with open standard user accounts via lightweight directory access protocol (LDAP), such as Active Directory, for example, to provide a PKI registration authority (RA) function allowing quick validation and registration of players from existing web and gaming establishment player account databases.

Token 110 may use multiple location determining mechanisms including GPS, Cell ID, and WIFI to provide varying levels of gaming device 104 location accuracy to comply with state and gaming establishment rules and regulations. Token 110 may store and statistically determine the probabilistic certainty of location of gaming device 104 based on historical and current geospatial scan data using, for example, one or more components within token 110 (e.g., one or more MEMS sensors, a camera, etc.) to maintain accuracy and certainty of location in case of location service interruption.

Token 110 may also include strong digital rights management to activate and protect service-related software and digital property within token 110 and/or gaming device 104 to ensure the location and authentication services provided by token 110 and/or gaming device 104 are not tampered with and to ensure that the services are not executed without token 110 being physically connected to gaming device 104. Accordingly, token 110 may provide software piracy protection, enforcement of license terms (which may be securely stored within token 110), and may enable portability of authentication and location services across multiple web enabled client platforms.

Figure 2:
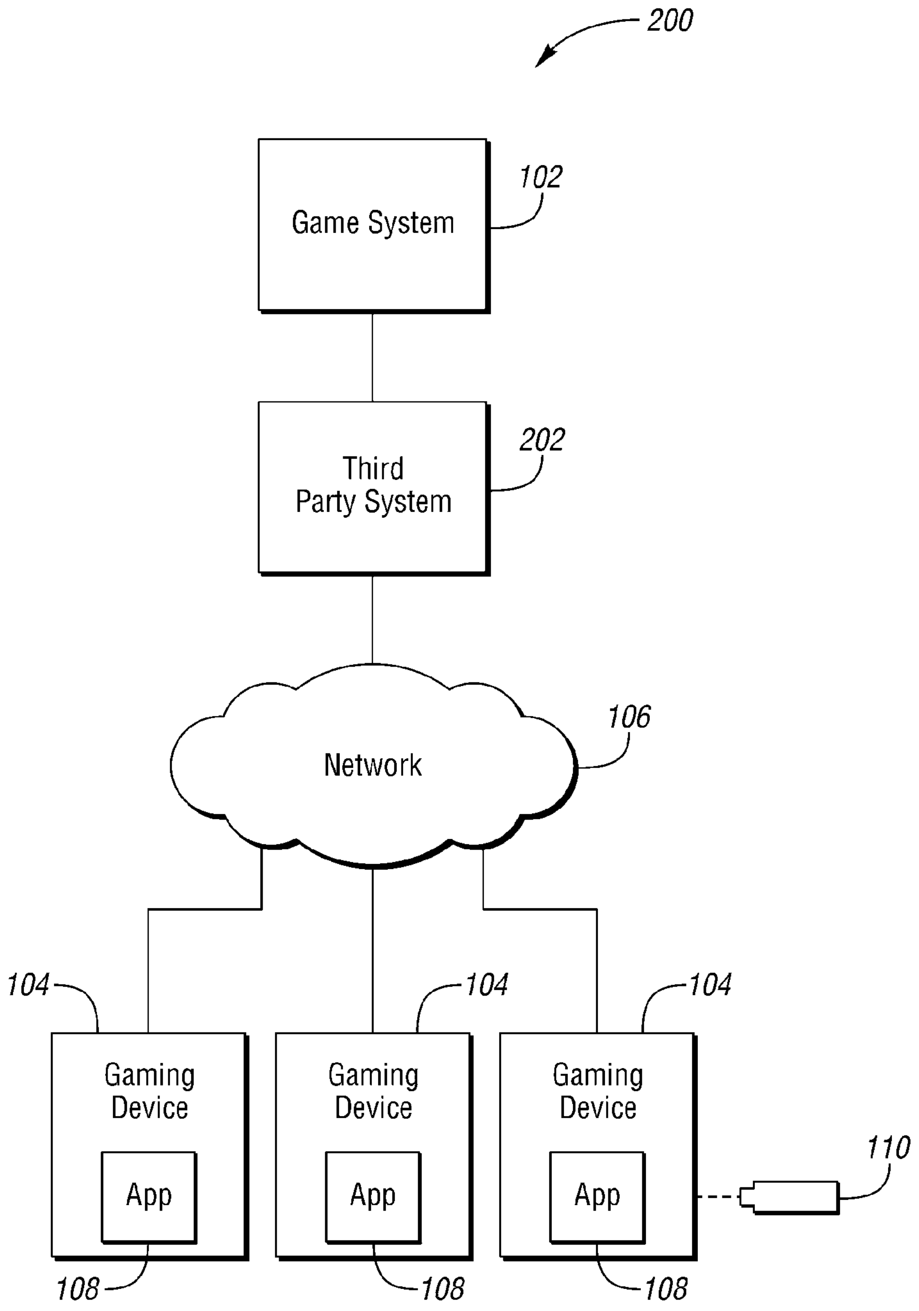
FIG. 2 is a block diagram of another system that may be used to play a wagering game.

FIG. 2 is a block diagram of another system 200 that may be used to execute the methods described herein to play one or more wagering games, such as online poker. Unless otherwise specified, system 200 is substantially similar to system 100 (shown in FIG. 1), and similar components are labeled in FIG. 2 with the same reference numerals used in FIG. 1.

System 200 includes game system 102 that may be connected to a third party system 202. It should be recognized that game system 102 may be connected to third party system 202 through network 106 (e.g., the Internet), or by any other data connection or network. In addition, third party system 202 may be connected to gaming devices 104 through network 106 or any other network or connection.

In one embodiment, third party system 202 is a third party web server that provides a third party web site to the players. For example, the third party web site may be a site aggregator, a blog, or any other site that provides links to various games, including the wagering game provided by game system 102. In another embodiment, third party system 202 is a casino system that provides a casino web site to the players. The players may enter the casino web site and play games that are displayed on or embedded in the casino web site but that are provided by game system 102. The games displayed on the casino web site may be branded by the casino, for example. Alternatively, third party system 202 may include any other suitable system and/or may provide any other suitable web site or application to gaming devices 104 to enable the players to play the wagering game. In other respects, system 200 operates substantially similarly with respect to system 100.

Figure 3:
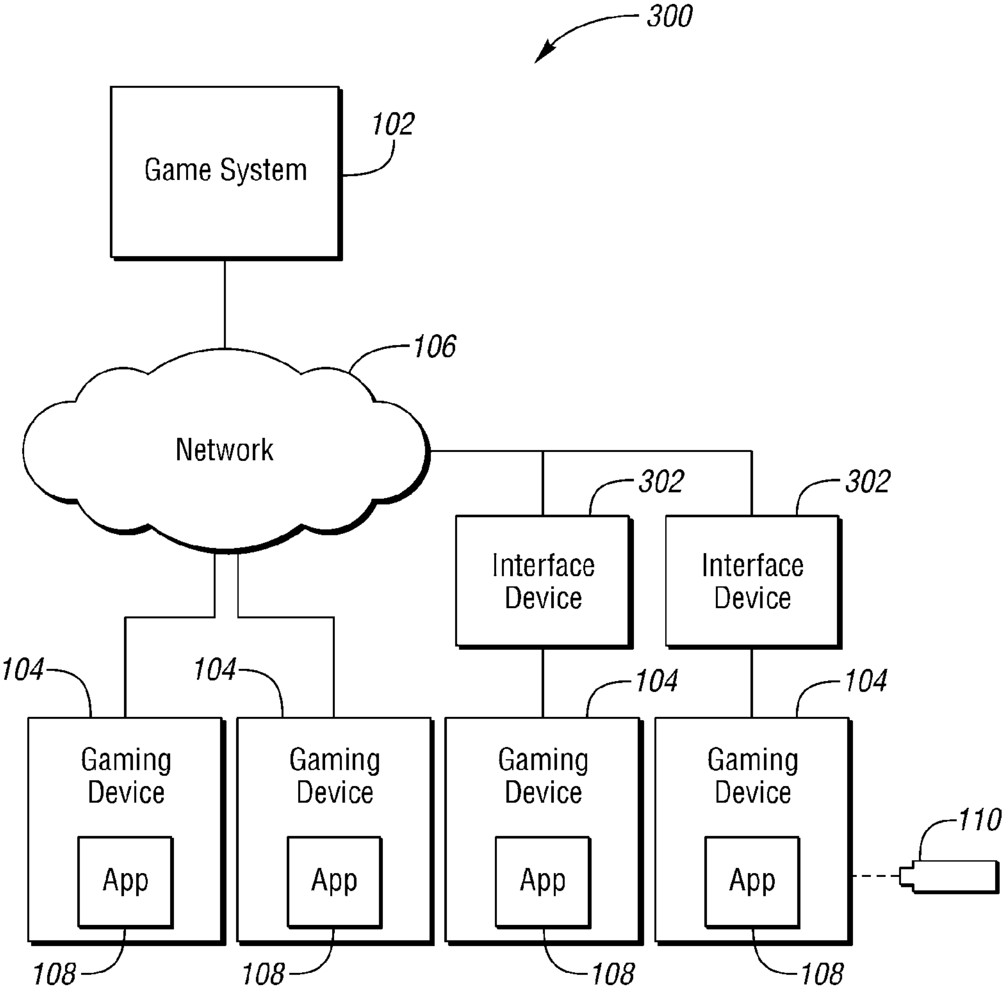
FIG. 3 is a block diagram of another system that may be used to play a wagering game.

FIG. 3 is a block diagram of another system 300 that may be used to execute the methods described herein to play one or more wagering games, such as online poker. Unless otherwise specified, system 300 is substantially similar to system 100 (shown in FIG. 1), and similar components are labeled in FIG. 3 with the same reference numerals used in FIG. 1.

System 300 includes a plurality of gaming devices 104 connected to game system 102 through network 106. In addition, one or more gaming devices 104 may be connected to game system 102 and to network 106 through one or more interface devices 302.

In one embodiment, interface devices 302 are set-top boxes that enable a device, such as a television, to be connected to network 106. In such an embodiment, the television may become gaming device 104, or the television and set-top box may jointly be considered a gaming device 104. In one embodiment, gaming device 104 may be a smart television that incorporates functionality of the set-top box within the television. The set-top box may include one or more applications (similar to application 108) that enable gaming device 104 to access the game through game system 102. In other respects, system 300 operates substantially similarly with respect to system 100 and system 200 (shown in FIG. 2).

In another embodiment, interface device 302 may be a computer or a computing device that enables a gaming device 104, such as a tablet computing device or a smart phone, to connect to game system 102. For example, a gaming device 104, such as a tablet computing device or a phone, may be connected to an interface device 302, such as a computer, via a remote desktop application or another means to enable gaming device 104 to interact with game system 102. In other respects, system 300 operates substantially similarly with respect to system 100.

Figure 4:
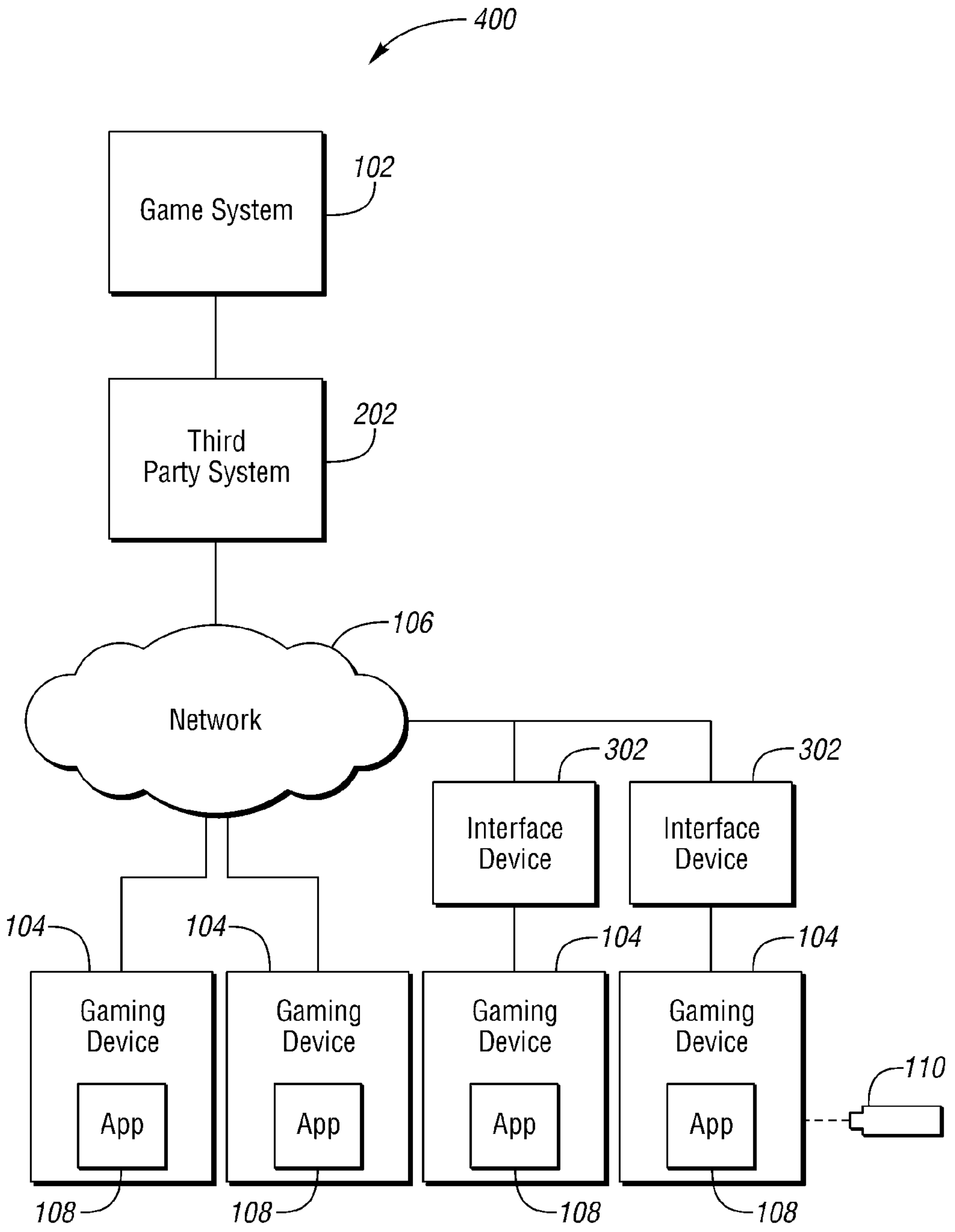
FIG. 4 is a block diagram of yet another system that may be used to play a wagering game.

FIG. 4 is a block diagram of another system 400 that may be used to execute the methods described herein to play one or more wagering games, such as online poker. Unless otherwise specified, system 400 is substantially similar to system 100 (shown in FIG. 1), system 200 (shown in FIG. 2), and system 300 (shown in FIG. 3), and similar components are labeled in FIG. 4 with the same reference numerals used in FIG. 1, FIG. 2, and FIG. 3.

System 400 includes a plurality of gaming devices 104 connected to game system 102 through network 106 and through third party system 202. In addition, one or more gaming devices 104 may be connected to game system 102, third party system 202, and to network 106 through one or more interface devices 302. In other respects, system 400 operates substantially similarly with respect to system 100, system 200 (shown in FIG. 2), and system 300 (shown in FIG. 3).

Figure 5:
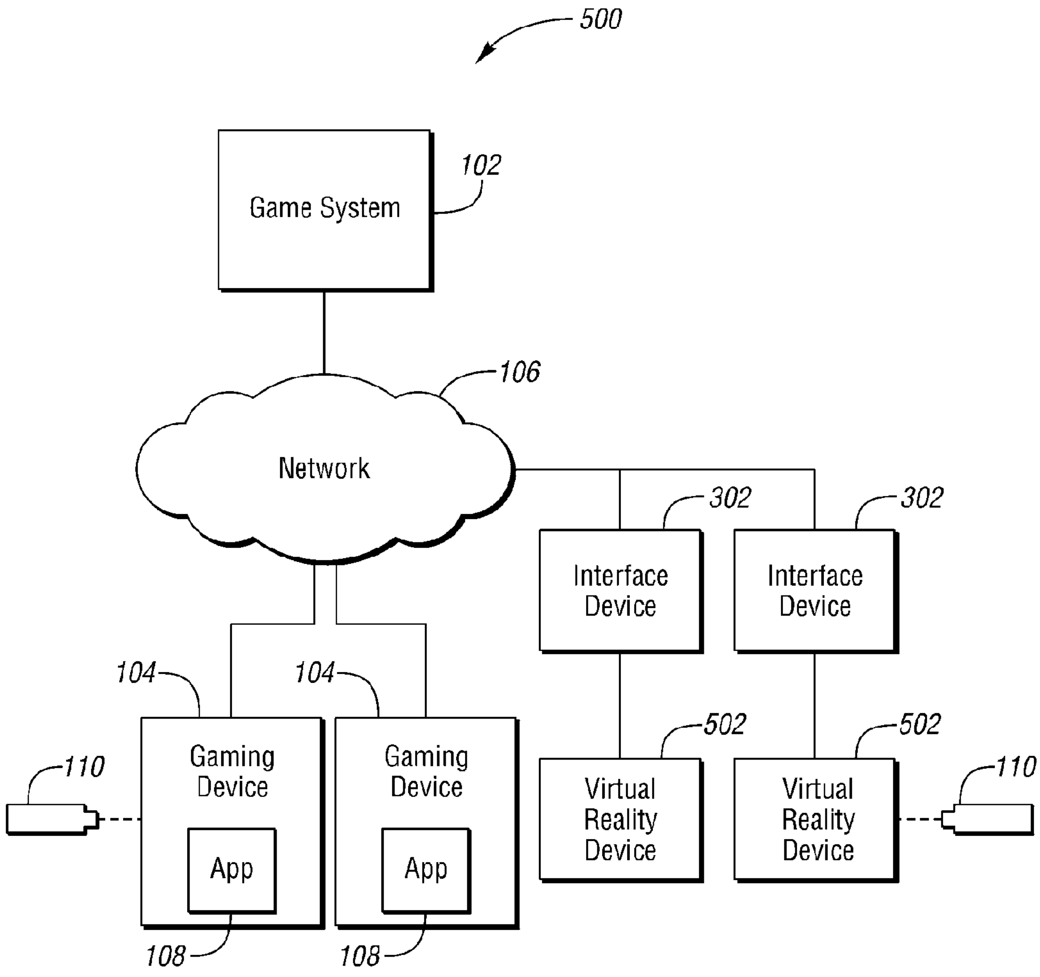
FIG. 5 is a block diagram of still another system that may be used to play a wagering game.

FIG. 5 is a block diagram of another system 500 that may be used to execute the methods described herein to play one or more wagering games, such as online poker. Unless otherwise specified, system 500 is substantially similar to system 100 (shown in FIG. 1) and system 300 (shown in FIG. 3), and similar components are labeled in FIG. 5 with the same reference numerals used in FIG. 1 and FIG. 3.

System 500 includes a plurality of gaming devices 104 connected to game system 102 through network 106 and through third party system 202. In addition, one or more virtual reality (VR) devices 502 may be connected to game system 102 and to network 106 through one or more interface devices 302. Alternatively, aspects of interface device 302 are incorporated into one or more VR devices 502 to enable VR devices 502 to connect directly to game system 102 through network 106.

VR devices 502 may include, for example, a VR headset and a pair of gloves or hand units. The headset may include a display that displays content of the game through at least a portion of the player's field of vision when the headset is worn. The headset may also include one or more accelerometers or other sensors that determine a movement of the player's head. In addition, the gloves or hand units may include one or more accelerometers or other sensors that determine a movement of the player's hands. As described more fully herein, the player may use VR device 502 to view the game and/or an environment of the game in a virtual setting, such as a virtual three-dimensional (3D) setting and may interact with the game and/or the game environment.

It should be recognized that the headset and/or the gloves or hand units may be replaced or supplemented with any other suitable device that enables VR device 502 to function as described herein. In other respects, system 500 operates substantially similarly with respect to system 100 and system 300.

Figure 6:
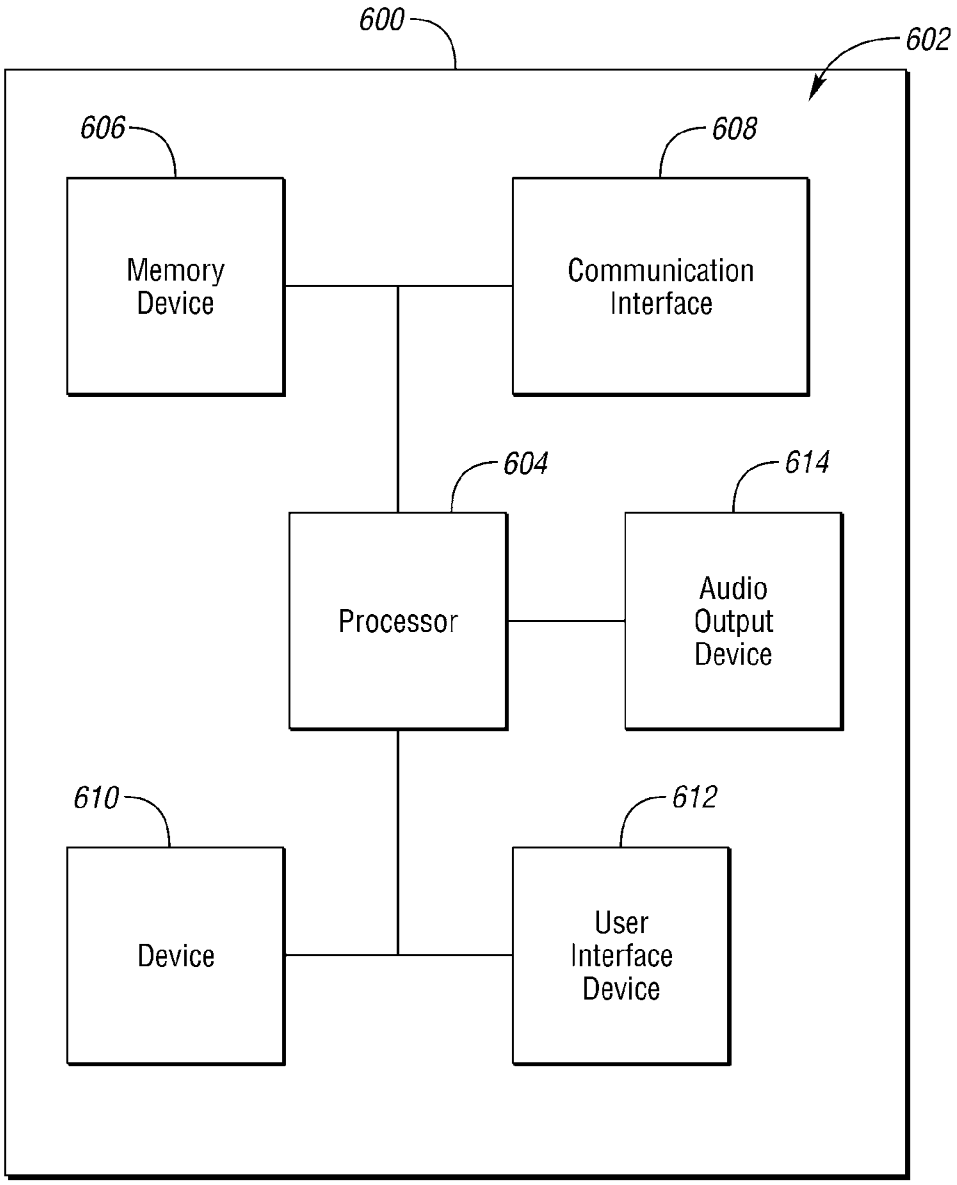
FIG. 6 is a block diagram of a computing device that may be used with the systems and methods described herein.

FIG. 6 is a block diagram of a computing device 600 that may be used with the systems and methods described herein. More specifically, one or more gaming devices, servers, or other devices or systems described herein may be implemented as, or may include, a computing device 600. For example, game system 102, gaming devices 104, third party systems 202, interface devices 302, and VR devices 502 may be, or may include, one or more computing devices 600.

Computing device 600 includes a plurality of computing device components 602, such as a processor 604, a computer-readable memory device 606, and a communication interface 608. In one embodiment, computing device 600 may also include a display 610, a user interface device 612, and/or an audio output device 614. It should be recognized that memory device 606, communication interface 608, display 610, user interface device 612, and audio output device 614 (if provided) may be connected to processor 604 and/or to each other via any suitable bus or busses, interfaces, or other mechanisms.

Processor 604 includes any suitable programmable circuit including one or more microcontrollers, microprocessors, application specific integrated circuits (ASICs), systems on a chip (SoCs), programmable logic circuits (PLCs), field programmable gate arrays (FPGAs), and/or any other circuit capable of executing the functions described herein. The above examples are exemplary only, and thus are not intended to limit in any way the definition and/or meaning of the term "processor."

Memory device 606 includes non-transitory computer readable medium, such as, without limitation, random access memory (RAM), flash memory, a hard disk drive, a solid state drive, a compact disc, a digital video disc, and/or any suitable memory. Memory device 606 may include data as well as instructions that are executable by processor 604 to program processor 604 to perform functions described herein. For example, the methods described herein may be performed by one or more processors 604 executing instructions stored within one or more memory devices 606.

Communication interface 608 may include, without limitation, a network interface controller (NIC) or adapter, a radio frequency (RF) transceiver, a public switched telephone network (PSTN) interface controller, or any other communication device that enables computing device 600 to operate as described herein. In one embodiment, communication interface 608 may connect to communication interfaces 608 of other computing devices 600 through network 106 or another network using any suitable wireless or wired communication protocol.

Display 610 may include, without limitation, a liquid crystal display (LCD), a vacuum fluorescent display (VFD), a cathode ray tube (CRT), a plasma display, a light-emitting diode (LED) display, a projection display, and/or any suitable visual output device capable of displaying graphical data and text to a user. For example, display 610 may be used to display a graphical user interface to a player or an administrator, one or more images associated with a game such as poker or another wagering game, player statistics, gameplay data, and/or any other suitable data.

User interface device 612 may include, without limitation, a keyboard, a keypad, a touch screen, a mouse, a scroll wheel, a pointing device, an audio input device employing speech-recognition software, a video input device that registers movement of a user, and/or any other suitable device that enables the user to input data into computing device 600 and/or retrieve data from computing device 600.

Audio output device 614 may include, without limitation, one or more speakers, or any other device that enables data to be audibly output from computing device 600. For example, gameplay data and/or music may be audibly output from audio output device 614.

While the foregoing computing device components 602 have been described as being included within a computing device 600, it should be recognized that at least some computing devices 600 may not include each component 602. For example, a computing device 600 may not include audio output device 614. In addition, a computing device 600 may include any suitable number of each individual computing device component 602. For example, a computing device 600 may include a plurality of processors 604 or processor cores, a plurality of memory devices 606 (of the same or different types, sizes, etc.), and/or a plurality of displays 610.

Figure 7:
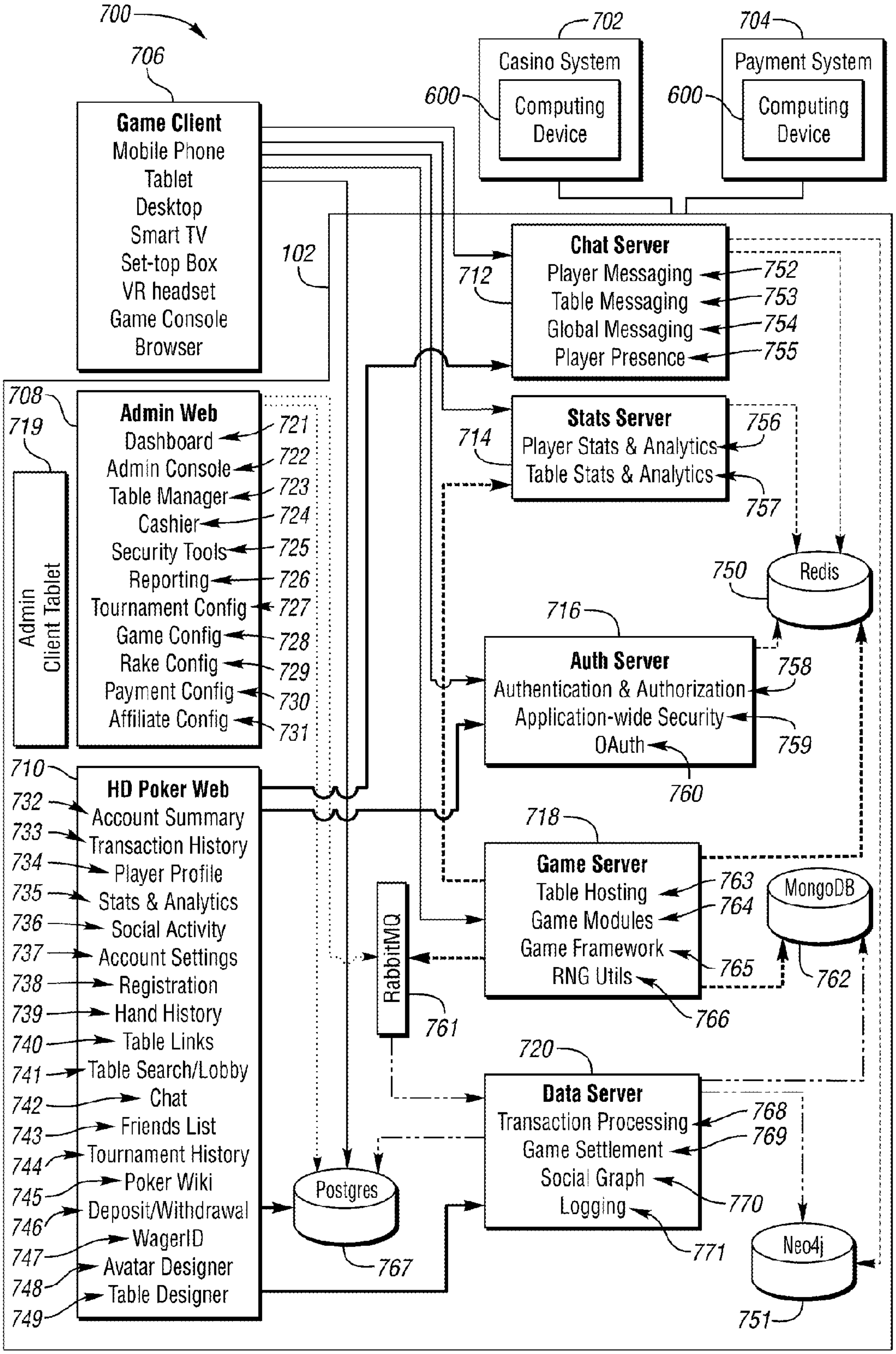
FIG. 7 is a block diagram of a system architecture that may be used to implement the systems and methods described herein.

FIG. 7 is a block diagram of a system architecture 700 that may be used to implement the systems and methods described herein. In one embodiment, system architecture 700 includes game system 102, a casino system 702, a payment processing system 704, and one or more game clients 706. Alternatively, system architecture 700 may not include casino system 702 and/or payment processing system 704. For example, in some embodiments, system architecture 700 may be used to provide a free-to-play wagering game that does not require an input of real money by the players for the players to participate in the game. Accordingly, payment processing system 704 and/or casino system 702 may not be included in such embodiments.

In one embodiment, casino system 702 is a third party system 202 that may be implemented as one or more computing devices 600, or may include one or more computing devices 600. Casino system 702 may include a plurality of databases, such as a player database and/or a marketing database for the casino or other gaming establishment associated with casino system 702. Casino system 702 may also include one or more web servers that present casino web sites to players. The player database may include information about players who have registered or otherwise associated with the casino. The marketing database may include, for example, icons, graphics, logos, trademarks, and/or any other data (also referred to as "brand information") associated with the casino to enable content associated with the game to be branded by the casino. Casino system 702 may also include an accounting system and/or other systems that enable the casino to operate according to applicable regulatory frameworks, for example.

Payment processing system 704 may include one or more computing devices 600 that enable system architecture 700 to process payments and credits associated with the players of the games operated by system architecture 700. For example, payment processing system 704 may be associated with a bank or another financial institution or intermediary that deposits money into a player account associated with the player to enable the player to enter wagers during the game. Payment processing system 704 may also credit money to a player account with a financial institution when the player cashes out or otherwise ends a game session.

In one embodiment, game system 102 includes an admin web interface 708, a poker web interface 710, a chat server 712, a statistics server 714, an authentication server 716, a game server 718, and a data server 720. While one of each of the foregoing components is illustrated in FIG. 7, it should be recognized that any number of each of the foregoing components of game system 102 may be included. Alternatively, any of the components of game system 102 may be omitted or may be combined with any other component as desired. In addition, while the embodiments described herein are directed to components and systems for playing a game of poker, it should be recognized that any wagering game may be played using game system 102 with modifications to game system 102 that would be understood to one of ordinary skill in the art as informed by the disclosures herein.

In one embodiment, game client 706 is an application 108 that is installed on or otherwise included in a gaming device 104, such as a mobile phone, a tablet computing device, a desktop computer, a smart TV, a VR headset or other device, and/or a game console. In one embodiment, game client 706 is a web browser that is used by gaming device 104 to connect to other components of game system 102.

Admin web interface 708 is a web page or another web-based interface that enables an administrator to access configuration settings and other data associated with the wagering game to be played. In one embodiment, an application, such as an admin client 719, may be installed on a computing device 600, such as a desktop computer or a tablet computing device, to provide access to admin web interface 708. Access to admin web interface 708 may be restricted to administrators who have a valid username and password associated with admin web interface 708.

In one embodiment, admin web interface 708 provides the administrator access to a plurality of administrative web pages, application tabs, or other user interfaces, including a dashboard 721, an admin console 722, a table manager 723, a cashier interface 724, security tools 725, a reporting interface 726, a tournament configuration interface 727, a game configuration interface 728, a rake configuration interface 729, a payment configuration interface 730, and an affiliate configuration interface 731. Alternatively, any of the above-identified administrative web pages, application tabs, or other user interfaces of admin web interface 708 may be omitted, combined together, or split into other components as desired.

Dashboard 721 presents an overview of one or more configuration settings and/or other aspects of the wagering game and/or game system 102 to the administrator. For example, dashboard 721 may present a number of poker tables ("tables") that are currently being used by players, a resource usage of game system 102, and/or any other suitable aspects of the wagering game and/or game system 102. In one embodiment, dashboard 721 may be customizable to enable the administrator to add or remove widgets or other tools for displaying the aspects of the wagering game and/or game system 102.

Admin console 722 enables the administrator to change settings for players registered with game system 102. For example, admin console 722 may enable the administrator to grant access to the wagering game for a player, revoke access to the wagering game for the player, set or remove a limit to an amount of money the player is authorized to wager, administer one or more reward programs for the player, and/or to perform any other suitable action.

Table manager 723 enables the administrator to administer and/or configure one or more tables for use during one or more games. For example, table manager 723 enables the administrator to set or adjust game rules for play at one or more tables, add or remove tables from a virtual casino or room, schedule one or more games, and/or associate tables with a corporation, entity, or individual.

Cashier interface 724 enables the administrator to access transaction histories of the players and to access other financial reporting tools for game system 102 and/or the games played on game system 102. For example, cashier interface 724 enables the administrator to view deposits or credits to player accounts and withdrawals from the player accounts (e.g., as a result of wagers placed by the players and/or as a result of the players cashing out). In one embodiment, cashier interface 724 may also enable the administrator to add promotional credits or other awards to the player's accounts.

Security tools 725 enable the administrator to investigate suspicious activity and/or to review reports regarding suspicious activity. For example, the administrator may use security tools 725 to determine whether a player is colluding with another player to increase the odds of the colluding players winning a game and/or to detect fraud by one or more players. Security tools 725 may be implemented as one or more web services and/or applications that may be executed by administrator and/or that may automatically run in the background, such as on a scheduled basis. In one embodiment, security tools 725 may use pattern recognition tools to determine whether fraud, collusion, and/or any other suspicious activity is occurring during a game.

Reporting interface 726 enables the administrator to generate and view one or more reports regarding the game and/or the players of the game. The reports may be generated for auditing purposes, for compliance purposes, and/or for any other purpose. The reports may include a history of each player's interactions with game system 102 and/or the game, a history of events and player interactions at each table, and/or any other suitable data. The reports may be downloaded and/or transmitted to any suitable device as desired.

In one embodiment, tournament configuration interface 727 is a control panel or another interface that enables the administrator to create, configure, and deploy tournaments (e.g., poker tournaments) and tables for the tournaments. For example, the administrator may select the tables to be included in a tournament and may configure the attributes of the tables in accordance with the tournament to be played.

In one embodiment, the administrator may configure one or more tournaments, such as online poker tournaments, to end after a predetermined amount of time has elapsed (sometimes referred to as a "guaranteed finish time tournament"). In an embodiment, game system 102 may calculate and select a blind amount for the big blind and the small blind (e.g., in a Texas Hold 'Em tournament) based on the time elapsed in the tournament and/or based on the amount of time remaining until the desired end of the tournament (as determined or set by the administrator). For example, the blinds may be adjusted based on the number of players left in the tournament and the amount of time that has elapsed in the tournament to achieve a desired end time for the tournament. The blind amounts to be used in a hand may additionally or alternatively be calculated based on an amount of chips or money that each player has, based on a speed of the gameplay, and/or based on any other suitable information. In one embodiment, the blind amounts set by game system 102 for some tables may be different than the blind amounts set for other tables. Accordingly, each table may have a different blind amount and blind amount progression during the same tournament. By dynamically adjusting the blind amounts during the tournament, the amount of time that it takes players to be eliminated may be at least partially controlled, thus allowing the tournament to complete at or near the desired end time.

In a specific embodiment, the guaranteed finish time tournament may be configured to include a clock displayed next to each player's avatar in the tournament. Each time it is a player's turn to act, the player's clock begins counting down. When the player acts, the clock stops and the next player's clock starts to count down. A total amount of time for each player's clock may be calculated by dividing the desired tournament length by the number of players in the tournament. In such an embodiment, a player can be eliminated from the tournament in either of two ways. First, the player may be eliminated by losing all of his or her chips. In this case, the remaining time left on the player's clock is evenly distributed between all other remaining players in the tournament. Second, the player may be eliminated when the player's clock reaches 0. In this case, the player's remaining chips are removed from play.

The timing structure of the guaranteed finish time embodiment described above may also be implemented for Sit & Go games in live poker rooms using chess clocks or the like for each player at the table. Players in this case would need to fully complete their action before hitting their clock.

For the guaranteed finish time tournament embodiment, a time bank loaded with a predetermined amount of time may be implemented in addition to the player clocks in order to prevent stalling near blind level changes or payout jumps. Each player may take no longer than the amount of time remaining on the time bank for an individual turn. If the time bank runs out before the player takes an action, the player will be automatically check/folded, or another predetermined action may be automatically taken for the player. If the automatic action is taken for the player in this embodiment, the player will not be removed from the tournament assuming the player's clock (described above) still has time remaining.

Another embodiment of the guaranteed finish time tournament described above may provide "bounties" on a player's time (hereinafter referred to as a "time bounty" tournament). Some poker tournaments award a prize to a player if the player eliminates another player (also known as "busting" or "knocking out" the other player). Such prizes are typically in the form of money. In a time bounty tournament, the reward for eliminating another player is that the player receives the time left on the eliminated player's clock, rather than having the eliminated player's time distributed evenly among the remaining players in the tournament. This provides additional incentive for players to eliminate other players, and an optimal strategy for playing in this type of tournament may be different than a strategy employed in other types of poker tournament.

In another embodiment, a fluctuating blind structure tournament may be provided. For example, the blind amounts may vary for each hand such that even consecutive hands at the same table may have different blind amounts. In one embodiment, the fluctuating blind structure may be used to facilitate maintaining a desired average chip stack size for players throughout a tournament. If the average chip stack size is above the desired amount, the blind amounts may increase more rapidly. In contrast, if the average chip stack size is below the desired amount, the blind amounts may increase more slowly.

In another embodiment, a "no position" poker tournament may be provided. In the no position poker tournament, there is no predetermined starting position or player who must act first in the hand. Rather, any player may act first to become the first player in the hand. In one embodiment, the first action may not be a fold. If no player acts within a predetermined amount of time (such as 3 seconds or 5 seconds, for example), all players' hands are automatically folded (or check/folded). After the first player acts, play continues in a clockwise direction from the first player in an otherwise typical fashion. It should be recognized that the no position poker tournament structure may be implemented for Sit & Go games, tournament games, and/or heads-up games as desired.

In another embodiment, a tournament may be configured to enable at least some players (sometimes referred to as "late registration players" or "late players") to buy-in to the tournament after the tournament has already started, even allowing the players to register at late stages in the tournament. A buy-in amount, or a cost to enter the tournament, and the number of chips given to the late registration players may be based on the number of players remaining in the tournament and based on the number of chips in play during the tournament. Alternatively, the late registration player can receive the same number of chips for the same buy-in amount up to a predetermined late entry time, after which point other late registrants may have increased buy-in requirements and/or may receive an amount of chips based on the number of players remaining in the tournament. In one embodiment, players may register at any time until the point at which a predetermined number of players remain in the tournament. For example, in one embodiment, players may register late until 5 players remain in the tournament. However, the players who register late may be required to pay more money to buy-in to the tournament than players who registered earlier.

As an illustrative example of the late registration tournament configuration, consider a tournament in which an initial buy-in amount at the beginning of the tournament is $10 and in which the players receive 3000 chips for the initial buy-in. If 100 players initially buy in to the tournament, the total prize pool would be $1000 and 300,000 chips would be in play during the tournament. Each chip would therefore be worth about $0.003. If a late player decides to enter the tournament when 17 players remain in the tournament, for example, the player would receive an amount of chips equal to the average chip stack at that point in the tournament. The average chip stack is calculated by dividing the number of chips in play by the number of remaining players. In this example, the average chip stack would be 300,000 divided by 17, which is 17,647 chips (rounded down). Therefore, the late player would receive 17,647 chips in this example.

The cost of buying-in by the late player may be calculated by the number of chips the late player receives multiplied by the value of the chips. Since the value of the chips was calculated to be about $0.003 above, and the number of chips the late player receives is 17,647, the cost of buying the chips would be about $52.94. However, since the late player receives a benefit in registering late, such that the player did not have to endure multiple chances of being eliminated in prior rounds, the buy-in cost may be increased by a predetermined amount or factor, for example. In one embodiment, the buy-in cost may be multiplied by a factor of 2 to result in a total buy-in cost of $105.88 for entering the tournament. The buy-in cost may be multiplied or adjusted by increasing amounts as the tournament progresses closer to the final table or grouping of players. If a late registration player enters the tournament after other players have been eliminated, the late registration player's buy-in amount may be added to the pot that is winnable by the remaining players only. For example, if a player is eliminated after winning a prize or a portion of the chip pool, that player would not receive any portion of the buy-in amount of another player who registers afterward. It should be recognized that aspects of the tournament structures and embodiments described above may be combined together or may be modified with any other embodiment described herein. Additionally, any other suitable formula or calculation may be used to determine the cost of buying in to the tournament, the value of the chips, and/or the number of chips provided to the player at late registration.

Game configuration interface 728 is a control panel or another interface that enables the administrator to create, configure, and deploy games, such as poker games. For example, the administrator may configure a type of poker game to be played (e.g., Texas Hold'Em, Omaha, etc.), a timing or a speed of game play for the game (such as a timeout period in which the player must make an allowable action or forfeit his/her turn), buy-in limits, and/or blind limits. The game configurations may be specific to tables or rooms of tables in one embodiment such that different tables may be configured differently.

Rake configuration interface 729 is a control panel or another interface that enables the administrator to create and adjust fees and/or rakes for tables and games. For example, rake configuration interface 729 may enable the administrator to establish a rake for the pot of each hand (i.e., a "pot rake"), a game entry fee, a subscription fee for access to the games, and/or any other suitable fee or rake. The pot rake may be set at a fixed percentage of the pot, such as 5% up to a predetermined maximum amount or cap. The above rakes and fees are only examples for illustration purposes, and it should be recognized that any suitable percentage or value may be used for the pot rake and/or fees. In one embodiment, the pot rake and/or fees may be apportioned among two or more entities or individuals. For example, the pot rake and/or fees may be apportioned among a game owner or operator, a table owner or operator, an entity referring players to the game or table, and/or any other entity, or may be at least partially returned to one or more players.

Payment configuration interface 730 is a control panel or another interface that enables the administrator to configure and establish connections to one or more payment systems 704 or other financial institutions or intermediaries that process payments and deposits on behalf of players and game system 102. Payment configuration interface 730 is configured to transmit any payment information and/or information associated therewith to the financial institutions or intermediaries in a Payment Card Industry (PCI) compliant manner, such as by using PCI compliant encryption keys and security protocols.

Affiliate configuration interface 731 is a control panel or another interface that enables the administrator to create and configure revenue sharing and/or marketing programs (sometimes referred to as affiliate programs) with affiliates of game system 102 or other third parties. For example, affiliate configuration interface 731 may enable the administrator to split one or more rakes or other fees, such as the pot rake, with an affiliate, such as a third party web site owner who links to one or more tables of game system 102. Affiliate configuration interface 731 may also enable the administrator to establish a plurality of affiliate ranks or levels based on predetermined criteria. For example, the administrator may establish affiliate ranks or levels based on an amount of revenue attributed to the affiliate, a number of players brought in by the affiliate, a length of time that the affiliate has been a part of the affiliate program, and/or any other suitable criteria.

In one embodiment, poker web interface 710 is a web page or another web-based interface that enables a poker player to access configuration settings and other data associated with the wagering game, such as the poker game, to be played. In one embodiment, an application 108 may be installed on a gaming device 104 operated by the player to provide access to poker web interface 710. Access to poker web interface 710 may be restricted to players who have a valid username and password associated with poker web interface 710.

In one embodiment, poker web interface 710 provides the player access to a plurality of web pages, application tabs, or other user interfaces for accessing data associated with the player and/or gameplay of the player, including an account summary 732, a transaction history 733, a player profile interface 734, a statistical interface 735, a social activity interface 736, an account settings interface 737, a registration interface 738, a hand history 739, a table links interface 740, and/or a table search interface 741. In addition, the web pages, application tabs, or other user interfaces associated with poker web interface 710 may include a chat interface 742, a friends list interface 743, a tournament history interface 744, a poker instruction interface 745, a deposit and withdrawal interface 746, a gameplay authorization interface 747, an avatar designer 748, and/or a table designer 749. Alternatively, any of the above-identified web pages, application tabs, or other user interfaces of poker web interface 710 may be omitted, combined together, or split into other components as desired.

Account summary 732 enables the player to view a current balance of the player's account. The player may also view a current balance of promotional credits or awards that have been given to the player. For example, the player may view non-monetary awards, such as an authorization to host a table for a reduced fee or for no fee, a free entry into a tournament, and/or any other suitable award. In addition, the player may view monetary awards, such as an amount of promotional credits that may be used during play of the game, a period of time in which deposits to the player's account will receive a predetermined additional amount of credits, and/or any other suitable award.

Transaction history 733 enables the player to view a history of recent transactions, such as deposits into the player's account with game system 102 and withdrawals from the player's account. The player may also view a history of promotional credits or awards that have been given to the player, such as the promotional credits described above.

Player profile interface 734 enables the player to view and change a list of personal information associated with the player (also referred to as a player profile). For example, the player may change a password for the player's account, an address and phone number of the player, privacy settings for the player's account, and/or any other information associated with the player and/or the player's account.

Statistical interface 735 enables the player to view performance analytics and/or statistics regarding the player's historical gameplay. In one embodiment, the player may also view a comparison of the player's gameplay with gameplay of other players and analytics thereof. The analytics and/or statistics may be provided to the player for free, or as a paid service.

Social activity interface 736 enables the player to view activity and achievements of the player's friends identified within game system 102. The activity and achievements may be related to gameplay of the player's friends and may include messages and/or other notifications from the friends. In one embodiment, the players may send gifts to each other, such as credits to be used during the game. Such gifts may be displayed within social activity interface 736, for example.

Account settings interface 737 includes a plurality of account settings that the player may change. For example, the player may change communication preferences (e.g., enable or disable communication with the player by email), sound preferences (e.g., enable or disable sound), and/or any other suitable settings. In one embodiment, the settings may be changed using widgets or other application interfaces linked or otherwise included within account settings interface 737.

Registration interface 738 enables the player to register to play games on game system 102 and/or to view registration information associated with the player. For example, the player may enter the first and last name, email address, residential address, birth date, and phone number of the player to register to play the games on game system 102. In some embodiments, additional information may be required based on jurisdictional requirements if the player is registering for playing the game using real money. In one embodiment, less information may be required if the player is registering solely for a free to play game in which real money is not used. If the player has been registered for either free to play or real money games, the registration information may be displayed within registration interface 738. In some embodiments, registration information may be provided from the player's account at a social media site.

Hand history 739 enables the player to view a history of the hands the player has played on a particular table or within a particular game session. The game sessions, tables, and hands played may be listed chronologically or in any other manner. The player may select the game session to list the tables played, and may select a table that was played to view the hands played at the table. The player may then select a hand that was played to view the details of the hand, and may optionally view a replay of the hand (i.e., a replay of the game in which the hand was dealt).

Table links interface 740 enables a player to view and create links to tables for use in third party web sites, for example. The player may view existing tables that are linked to the third party web sites, and may delete tables from the third party web sites or may add tables to one or more web sites. For example, the player may request that game system 102 provide a link to a table owned or operated by the player. Game system 102, through table links interface 740, may present a hyperlink or portion of code that may be inserted into the web site to link to the table. It should be recognized that a portion of the rake or fees generated by play on the linked table may be split between the player who owns or operates the table, the third party web site, and the owner or operator of game system 102 as described above.

Table search interface 741 enables a player to select one or more tables to join to play a wagering game on the tables. In one embodiment, table search interface 741 includes a graphical depiction of at least a portion of the available tables in a virtual lobby or another selection area. The tables may be grouped or sorted by selectable criteria, such as average pot size, number of hands played per hour, table owner, operator, skill level, wagering limits, number of seats available, public tables, private tables, tournament tables, table name, game type, and the like. Table search interface 741 enables the player to search for and/or filter tables by any of the above criteria such that only tables matching the selected criteria are displayed to the player. In one embodiment, tables are automatically recommended to the player by game system 102 based on the player profile, player skill level, friends that are playing on certain tables, amount of money or credits in the player's account, and/or tables that the player has recently played on, for example.

Chat interface 742 enables a player to view or initiate instant messages with other players, such as friends of the player. In one embodiment, chat interface 742 includes a chronological list of messages sent to the player from the player's friends and the messages sent from the player. In another embodiment, chat interface 742 enables the player to send instant messages to any player (not just friends of the player). In such an embodiment, chat interface 742 displays a list of all messages (or a predetermined number of messages) sent to and from the player. In some embodiments, to reduce a risk of collusion and to ensure fair play, chat interface 742 may be at least partially disabled when the player is playing at a table with one or more friends so that the player is prevented from sending messages to his or her friends at the table during the game.

Friends list interface 743 enables a player to view and manage a list of friends of the player. For example, the player may add or remove players from the friends list. In one embodiment, the player may view gameplay data of the friends and/or the tables the friends are playing on using friends list interface 743. In another embodiment, the player may join a table that one or more other friends are playing on using friends list interface 743.

Tournament history interface 744 enables a player to view a history of one or more tournaments the player has played in, or that have otherwise been played on game system 102. The tournaments, rounds of the tournament, and/or tables of the tournament may be listed alphabetically, by player, chronologically, or in any other manner. The player may select the tournament to list the rounds of the tournament and/or the tables played, and may select a table to view the gameplay of the table. It should be recognized that the tournaments may be viewed and/or categorized in any suitable manner to enable the player to view any suitable aspect or gameplay of the tournament or portions thereof.

Poker instruction interface 745 enables a player to view instructions or other information on how to play the game. For example, poker instruction interface 745 may provide a description of the rules of the particular game being played (e.g., Texas Hold 'Em, Omaha, etc.) and may provide tips or strategies for playing the games. In one embodiment, poker instruction interface 745 may include a knowledge base of poker information and/or strategy that may be updated and added to by players of game system 102.

Deposit and withdrawal interface 746 enables the player to add, delete, or update payment information associated with the player's account (e.g., credit card or debit card information). In one embodiment, deposit and withdrawal interface 746 is incorporated within player profile interface 734 and/or account summary 732.

Gameplay authorization interface 747 enables the player to view and/or update authorization information to enable the player to play games on game system 102. In one embodiment, the authorization information includes a certification of eligibility to play wagering games in the present jurisdiction and/or in other jurisdictions. For example, the authorization information may be embodied in a token or certificate (such as a wagerID™ token or certificate) that includes a list of jurisdictions in which the player is authorized to play wagering games. The authorization information (e.g., the token or certificate) may also include, or be linked to, a payment account in which money has been deposited for the player to use during the wagering games. The authorization information may be provided by a server or system that is separate from game system 102, or may be provided be game system 102.

Avatar designer 748 enables a player to select and customize an avatar to represent the player in one or more games. In one embodiment, the player may select an avatar from a list of predesigned human or human-like avatars, and may customize a variety of features of the avatar, such as hair color, face shape, skin color, eye color, clothing, and the like. In another embodiment, the player may select and customize an avatar that is non-human, such as an animal or an object, for example. In some embodiments, players can purchase items, avatars, or other content using real money, credits, or reward points, for example.

Table designer 749 enables a player to select and customize a table that the player owns and/or operates. For example, the player may select a material for the table frame (e.g., wood, steel, etc.), a material for the table top (e.g., cloth or felt), a color for the table top, a shape and/or color of the table legs, and the like. In one embodiment, the player may select one or more advertisements or logos to be displayed on the table. For example, the player may select an advertisement to be placed on the table top, or on the underside of the table top to be displayed at a specified time (e.g., by virtually flipping the table top over). Alternatively, the operator or owner of game system 102 may select advertisements to be displayed on various portions or facets of the tables.

In one embodiment, chat server 712 is connected to game client 706 and poker web interface 710. In addition, chat server 712 may be connected to a distributed memory grid 750 and to a graph database 751 described more fully herein. Chat server 712 facilitates transmitting instant messages or other messages within game system 102. In one embodiment, chat server 712 includes a player messaging component 752, a table messaging component 753, a global messaging component 754, and a player presence component 755.

Player messaging component 752 is an application or other program that enables chat server 712 to transmit instant messages or other messages to and from players. For example, player messaging component 752 may transmit instant messages from one player to a designated friend of the player. In one embodiment, to reduce a risk of collusion and to facilitate fair play, player messaging component 752 may be at least partially disabled when the player is playing with one or more friends at the same table so that instant messages or other messages are unable to be transmitted between the player and his or her friends during the game.

Table messaging component 753 is an application or other program that enables chat server 712 to transmit instant messages or other messages to players playing on a particular table. For example, table messaging component 753 may transmit messages indicating each phase of a hand or round of poker, such as an initiation of the hand, a winner of the hand, and the like. Table messaging component 753 may implement a chat room for players at a table, or players at a virtual casino or poker room, for example.

Global messaging component 754 is an application or other program that enables chat server 712 to transmit messages to every player in game system 102, to every player within a virtual casino or poker room, and/or to any other subset of players of game system 102. For example, global messaging component 754 may transmit a notification of an upcoming tournament, a notification of a bonus event or period of time, advertisements, or any other suitable message.

Player presence component 755 is an application or other program that enables chat server 712 to identify and update a state of the player. For example, player presence component 755 may provide an indication that the state of the player is online (e.g., logged into game system 102), offline (e.g., not logged into game system 102), playing a game at a table, waiting to play a game at a table, temporarily inactive (e.g., away from gaming device 104), or any other suitable state.

In one embodiment, statistics server 714 is connected to game client 706, game server 718, and distributed memory grid 750. Statistics server 714 may include a player statistics component 756 and a table statistics component 757. In one embodiment, statistics server 714 facilitates offloading a processing of statistics from game server 718 to reduce the processing and/or memory resources used by game server 718 during operation of the games.

Player statistics component 756 is an application or other program that analyzes and processes statistics relating to each player. For example, player statistics component 756 receives gameplay data associated with each player and aggregates or synthesizes the gameplay data into a summary of each player's statistics. Each player's summarized statistics may be archived or otherwise stored in distributed memory grid 750 for later retrieval. The summarized statistics may be presented in a chart, a table, or another form for viewing by the respective player. In one embodiment, game server 718, game client 706, and/or poker web interface 710 may request a player's statistics from statistics server 714. In such an embodiment, statistics server 714 may use player statistics component 756 to retrieve the player's statistics from distributed memory grid 750, may perform any required processing, aggregation, and/or synthesis of the statistics, and may transmit the statistics to the requesting device or system.

Table statistics component 757 is an application or other program that receives gameplay data associated with the gameplay at each table and aggregates or synthesizes the gameplay data into a summary of statistics of each table. The summarized statistics of each table may be archived or otherwise stored in distributed memory grid 750 for later retrieval in a similar manner as described above with reference to player statistics component 756.

In one embodiment, authentication server 716 is connected to game client 706, poker web interface 710, and distributed memory grid 750. Authentication server 716 facilitates authenticating and authorizing players and gaming devices 104 to play games on game server 718. Authentication server 716 includes an authentication component 758, an application security component 759, and an authentication bridging component 760.

Authentication component 758 is an application or other program that enables a player to log on to game system 102. For example, the player may provide a username and a password, and authentication component 758 verifies that the username and password are correct. Once the username and password are verified, the player is identified and access privileges are determined for the player. For example, the player may be identified as a table owner, and may be granted access to operate the table and/or adjust the properties of the table, e.g., through table manager 723 and/or table designer 749. As another example, the player may be determined to be authorized to play the game.

Application security component 759 is an application or other program that facilitates establishing and authenticating network connections from game client 706 to game system 102. In one embodiment, when game client 706 of a gaming device 104 establishes a network connection with game system 102 and is authenticated by authentication component 758, a token is generated and stored on gaming device 104 (e.g., within game client 706 or another location within gaming device 104). As described more fully herein, if the network connection between game client 706 and game system 102 is unexpectedly terminated, the token may be used to automatically restore access to resources and games of game system 102 without requiring the player or game client 706 to re-enter authentication credentials.

Authentication bridging component 760 is an application or other program that cooperates with application security component 759 to facilitate re-establishing access by game client 706 to resources of game system 102. In one embodiment, authentication bridging component includes an OAuth 2.0 compliant framework and/or module. When a player connects to game system 102 to play a game using game client 706, a player identifier (player ID), and a socket identifier (ID) are associated with the token generated by application security component 759. In addition, when the player selects a table at which to play a game, a table identifier (table ID) for the table is associated with the token.

The player ID is used to distinguish the player from other players who have accessed game system 102. The table ID is used to identify which table the player is playing on or has last played on. It should be recognized that multiple table IDs may be associated with an authentication token if the player is playing on, or has recently played on, more than one table. The socket ID is used to identify the network socket used to connect game client 706 to game system 102. The identifiers (e.g., player ID, table ID, and socket ID) may be implemented as one or more numbers, strings, or any other suitable identifiers. If the network connection between game client 706 and game system 102 is unexpectedly terminated, the token is transmitted to game system 102 (e.g., to application security component 759) by game client 706 when the network connection is reestablished. Application security component 759 retrieves the player ID, the table ID, and the socket ID associated with the token received, and renews access to the table or tables the player was playing on before the network interruption using the associated identifiers (player ID, table ID, and socket ID). Accordingly, the player may resume playing on the table or tables from before the network interruption occurred without needing to input the authentication credentials again (e.g., the username and password). The state of the tables and/or player hands is also restored such that the player may resume play of the game from the point at which the interruption occurred.

In one embodiment, game server 718 is connected to statistics server 714, game client 706, a messaging system 761, distributed memory grid 750, and a document database 762. Game server 718 provides the wagering games to players. In one embodiment, game server 718 includes a table hosting component 763, one or more game modules 764, a game framework 765, and one or more random number generator (RNG) utilities 766.

Table hosting component 763 is an application or other program that enables game system 102 to dynamically provide or provision tables on an as-needed basis to players. In one embodiment, table hosting component 763 provides a stateless table framework in which computing resources (e.g., processor and memory resources) are allocated to a new table only when one or more predetermined criteria are met. For example, the computing resources may only be allocated to a table (i.e., the table is only instantiated) when a predetermined number of players are ready to join the table. Such a stateless table framework facilitates reducing computing resources used by game system 102 as compared to at least some prior art systems.

In addition, during play of a game, a state of the table and a state of each player's hand is stored as one or more documents in document database 762 rather than in memory of game server 718. Accordingly, game system 102 may experience an unexpected shutdown and the table states and the player hand states may be preserved, thus minimizing an amount of data lost during the shutdown.

Game modules 764 are applications or other programs that provide the game functionality to game clients 706. For example, in one embodiment, game modules 764 control the gameplay of the games, ensure that the rules of the games are followed by the players, present one or more user interfaces usable with the games, provide randomly drawn cards during the games, and determine the winner of each game or hand (e.g., based on one or more winning criteria) for distribution of each game's pot. In one embodiment, a separate game module 764 is provided for each type of wagering game, such as Texas Hold 'Em, Omaha, and/or any other type of poker and/or other wagering game.

Game framework 765 is a collection of application programming interfaces (APIs) or other program components that enable game modules 764 to interact with other components or modules of game system 102. For example, game framework 765 may enable game modules 764 to implement one or more tables using table hosting component 763.

RNG utilities 766 includes one or more RNGs that provide random number generation to game modules 764 and/or other components of game system 102. For example, each time a new card is dealt during a game, game module 764 receives a random card and/or a random number for use in drawing a card from RNG utilities 766. In one embodiment, RNG utilities 766 use a pseudorandom algorithm to generate the random numbers and/or cards. In another embodiment, RNG utilities 766 use data based on a natural process or a nature-based RNG, such as a radioactive decay-based RNG, to generate true random numbers.

In one embodiment, data server 720 is connected to messaging system 761, poker web interface 710, one or more relational databases 767, document database 762, and to graph database 751. Data server 720 may include a transaction processing component 768, a game settlement component 769, a social graph component 770, and/or a logging component 771.

Transaction processing component 768 is an application or other program that receives and processes requests for data regarding game system 102. As such, transaction processing component 768 may offload at least some of the computing load from game server 718 for servicing at least some data requests. For example, transaction processing component 768 may serve as a backend access point by servicing requests for transaction, table, hand, and/or player histories for audit and/or compliance purposes without using resources of game server 718. In one embodiment, transaction processing component 768 gathers the requested data (e.g., transaction, table, hand, and/or player histories) from document database 762 and/or other databases and transmits the requested data to a requesting device, such as an auditor's computer.

Game settlement component 769 is an application or other program that facilitates completing administrative tasks for the games. For example, game settlement component 769 may cause the winnings from a hand to be credited to the winning player's account, and/or may cause the amounts bet by the players (and lost by the players) to be debited from the respective players' accounts.

Social graph component 770 is an application or other program that identifies and/or analyzes relationships, such as friendships, of the players of game system 102. For example, a social graph or another model of player relationships may be stored in graph database 751 for use with social graph component 770. In one embodiment, social graph component 770 may identify all friends of a selected player (i.e., all other players or individuals who are identified as friends of the selected player in graph database 751) or all players within a predetermined proximity or degree of separation of the selected player. It should be recognized that social graph component 770 may be used to identify players having any suitable relationship that satisfies one or more queries or criteria.

Logging component 771 is an application or other program that stores log files and/or other data in memory, such as within document database 762. In one embodiment, logging component 771 creates and/or stores auditing log files in document database 762 during an audit of game system 102, for example.

In one embodiment, relational database 767 is connected to game client 706, admin web interface 708, poker web interface 710, and data server 720. Relational database 767 may store data regarding player and administrative settings or configurations (such as settings or configurations set through admin web interface 708 and poker web interface 710) and/or any other suitable data.

In one embodiment, messaging system 761 is connected to admin web interface 708, game server 718, and data server 720. Messaging system 761 may use an advanced message queuing protocol, in one embodiment, to enable messages to be transmitted between components of game system 102, such as between admin web interface 708, game server 718, and data server 720. Accordingly, messages from a producing component (such as game server 718) may be transmitted to messaging system 761 and stored within a queue or another memory structure of messaging system 761. The messages may be transmitted from messaging system 761 to one or more consuming components (such as admin web interface 708 or data server 720) automatically or upon request by the consuming components, for example. It should be recognized that any suitable component of game system 102 may alternate between a producing component and a consuming component during operation of game system 102.

Distributed memory grid 750 is connected to chat server 712, statistics server 714, authentication server 716, and game server 718. In one embodiment, distributed memory grid 750 includes one or more key-value stores. Distributed memory grid 750 may be used to store archived statistics of players, tables, and/or any other statistics or data.

Document database 762 is connected to game server 718 and data server 720. In one embodiment, document database 762 stores documents, or document-oriented datasets, including data objects, arrays, and/or other data types associated with player hands and/or other aspects of game system 102, for example. As used herein, the terms "document" and "document-oriented dataset" refer to a semi-structured encapsulation and/or encoding of data using a non-relational database architecture. In some embodiments, documents may be provided by suitable non-relational database architectures such as JSON, BSON, XML, YAML, and the like. As used herein, the term "semi-structured" refers to database objects that are not required to conform to a predefined data structure or order. For example, the data objects may include groups of name-value pairs that are different than groups of name-value pairs of other data objects.

Graph database 751 is connected to data server 720. In one embodiment, graph database 751 stores a social graph of players. The social graph may include nodes representative of players and may include relationships between the players. The relationships may indicate that players are friends of each other, friends of friends, and the like.

Figure 8:
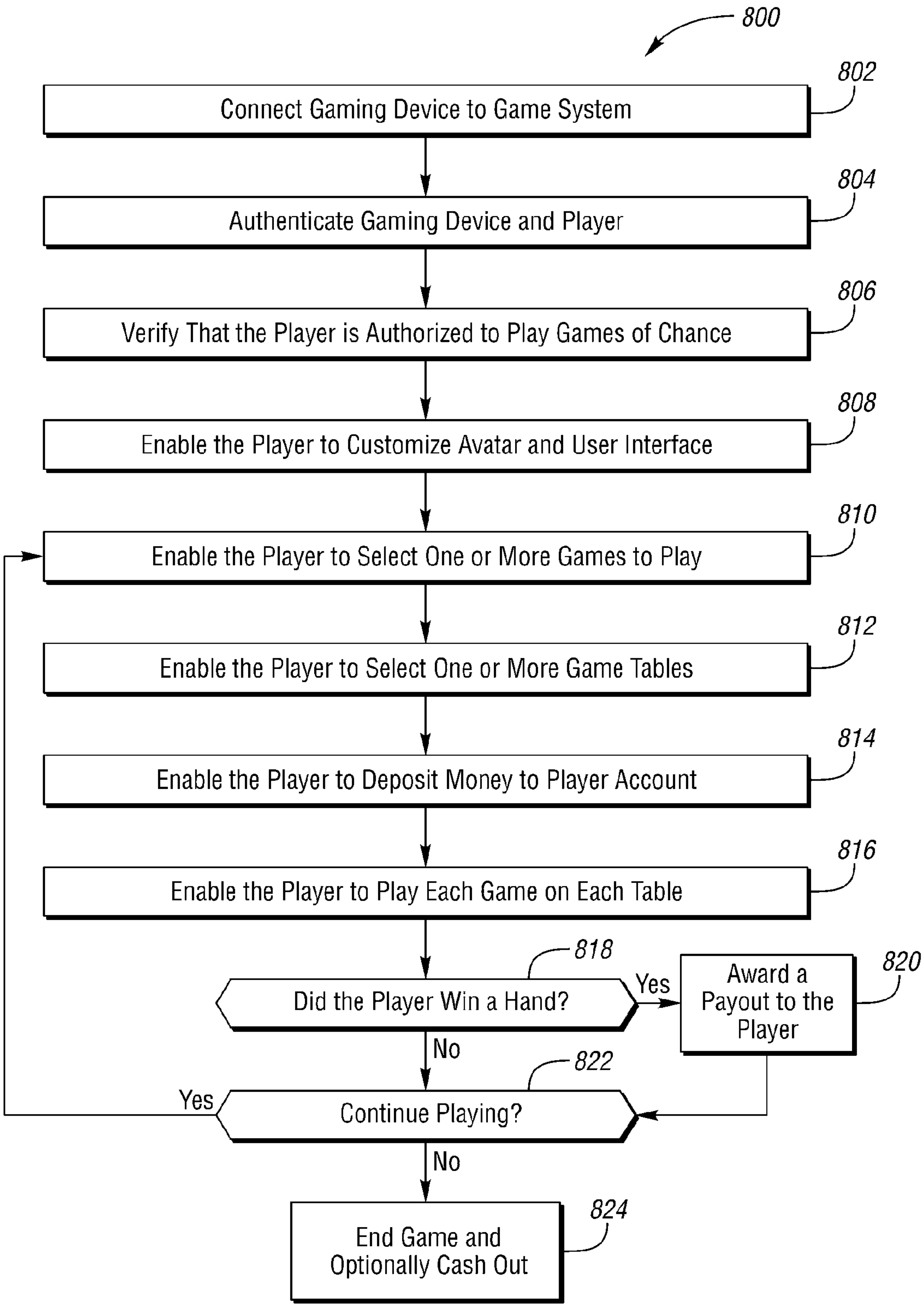
FIG. 8 is a flow diagram of a method of playing a wagering game that may be used with the systems and methods described herein.

FIG. 8 is a flow diagram of a method 800 of playing a wagering game that may be used with the systems and methods described herein. For example, method 800 may be used to play a game of poker using one or more gaming devices 104 and game system 102. While the following description is directed to playing a game of Texas Hold 'Em poker (limit or no limit), it should be recognized that method 800 may be used to play any suitable game of poker (or another wagering game). For example, method 800 may be used to play one or more games of Omaha poker, 7 Card Stud poker, Open Face Chinese Poker, and/or any other game in addition to, or instead of Texas Hold 'Em poker.

During execution of method 800, a player may connect 802 a gaming device 104 to game system 102 via a network, such as network 106. As described above, gaming device 104 may include a desktop computer, a laptop computer, a mobile phone, a tablet computing device, or any other suitable device. When gaming device 104 is connected to game system 102, gaming device 104 and/or the player may be authenticated 804 by game system 102 or by another system or device connected to game system 102. For example, gaming device 104 may transmit an authentication token or certificate, such as a wagerID™ token or certificate, to game system 102 to enable game system 102 to authenticate 804 gaming device 104 and/or the player. The token or certificate may also be used by game system 102 to verify 806 that the player is authorized to play one or more wagering games offered by, or implemented by, game system 102. Alternatively, other means of verifying that the player is authorized to play the wagering games may be used, such as referencing a list or a table of authorized players stored in game system 102, for example. The player may additionally or alternatively be authenticated by biometric data, such as fingerprint data from a fingerprint scanner, by cryptographic hardware tokens or dongles, by username and password, and/or by any other suitable method.

Additionally or alternatively, the player's location may be used to determine whether the player is authorized to play the game or games. For example, game system 102 may determine a location of gaming device 104 using a global positioning satellite (GPS) signal received at gaming device 104, e.g., through an antenna of gaming device 104 and/or through an optional GPS dongle or token (e.g., token 110) that may be connected to gaming device 104. The location of gaming device 104 may also be determined or verified using a secondary method, such as triangulating a location of gaming device 104 based on the cell phone towers (if gaming device 104 is a cell phone or a mobile device that receives cell phone signals) or wireless access points that gaming device 104 may connect to.

If the player and gaming device 104 are authenticated and if the player is authorized to play the wagering games, a user interface for game system 102 may be presented to the player. The user interface may present a plurality of icons, menus, commands, or other user interface elements that enable the player to perform one or more actions. For example, the player may be enabled 808 to customize an avatar associated with the player and/or to customize the user interface of game system 102 and/or for one or more wagering games. The player may also be enabled 810 to select one or more games to play, such as Texas Hold 'Em poker, Omaha poker, or the like. A list of poker tables or other tables associated with the selected game or games may be presented to the player to enable 812 the player to select the table or tables to play on for each game. The player may also select one or more options for each game and/or game table to be played, such as an initial amount of money to bring to the table, a speed of the gameplay, and the like. In some embodiments, a table buy-in interface may be presented to the player to enable the player to select an initial buy-in amount for the table, to select gameplay preferences for the table, such as whether to automatically "top-up" to replenish lost chips after a hand, whether to auto muck a hand, and/or to select any other suitable option. The selected preferences may be stored and automatically re-selected when the player chooses a table at a later time. At any point before, during, or after a game is selected and/or played, the player may be enabled 814 to deposit money or credits representative of money (either real money or play money) into a player account associated with the player on game system 102.

After the player has selected one or more games, tables, and any options, the player is enabled 816 to play each selected game on each selected table. It should be recognized that game system 102 may enable the player to play a variety of different games on different tables at the same time. For example, the player may play a first game of pot limit Texas Hold 'Em poker on a first table, a second game of Limit Omaha poker on a second table, and a third game of Open Face Chinese Poker on a third table. As described more fully herein, the tables may be displayed to the player simultaneously on gaming device 104 to enable the player to play the different games and tables concurrently.

In some embodiments, one or more identity verifications or challenges may need to be completed to play the game and/or to continue playing the game after a period of time has elapsed. For example, in one embodiment, a biometric challenge may be presented to the player that needs to be successfully completed before the player plays the game. In addition, further biometric challenges may be presented to the player that must be successfully completed at predetermined or random times to continue playing the game or games. The biometric challenges may include, for example, submitting a scan of the player's fingerprint or retina to be matched against a stored (or reference) scan of the player's fingerprint or retina, a recording of the player's voice to be matched against a stored voiceprint of the player, and/or any other suitable challenge. The biometric challenges may be randomly selected from a list of challenges in some embodiments.

In one embodiment, the player may designate one or more games or tables to be played in an accelerated fashion (sometimes referred to as a "fast-fold poker" game variation). In the fast-fold poker game variation, if the player folds a hand on one table, game system 102 automatically transfers the player to a newly created table of the same game type having the same limits as the prior table. In one embodiment, the player may be automatically seated at the new table with other players who are playing the fast-fold poker game variation without having to wait in a queue for a table to be prepared for the player. Gameplay may commence on the new table after a predetermined number of players join the table. For example, the game may begin once the maximum number of players (e.g., 9 players) have joined the table, or the game may begin once fewer than the maximum number of players (e.g., 5 or 7 players) have joined the table. In one embodiment, the number of players required to start the game may change based on a total number of players who have opted to play the fast-fold poker game variation. Accordingly, the game play described above in the fast-fold poker game variation may be significantly accelerated and an excitement associated with the game may be increased.

In another embodiment, the game may be played with a "run-it-twice" configuration if every remaining player at the table (i.e., every player who has not folded) has opted in to the configuration. In the run-it-twice configuration, when no more actions can be taken by players who remain in the hand (e.g., if all remaining players have gone "all in") and there are still community cards that have not been dealt, the remaining community cards for the hand are dealt and a duplicate set of the remaining community cards are also dealt. For example, if the two players went all in after the flop in a Texas Hold 'Em game, a first set of one turn card and one river card would be dealt, and a second set of one turn card and one river card would be dealt as well. Each set is paired with each player's hole cards to determine which player had the winning hand with each set. If a player has the winning hand with the first set but the other player has the winning hand with the second set, each player wins half of the pot for the hand. If one player has the winning hand with both sets, that player wins the entire pot and the other player wins nothing. In such a manner, additional variety and excitement may be added to the game. In one embodiment, each player may set a global configuration setting or option to opt in or opt out of the run-it-twice configuration, and may also override the global configuration setting if desired within a game.

After each hand of each game is finished, game system 102 determines 818 whether the player won the hand. If the player won the hand, game system 102 awards 820 a payout to the player which is typically equal to the pot the players competed to win during the game (minus any applicable rake). The player may continue 822 playing the game or the player may decide to end 824 the game and optionally cash out the player's winnings.

In one embodiment, the payout may be presented in the form of a gift card, reward certificate, or other instrument usable to deposit money into a player account at a later time. In another embodiment, the payout may be in the form of reward points or money redeemable at an online reward store or catalog. The reward store or catalog may offer the player one or more free rooms, meals, tickets, merchandise, or other goods or services in exchange for the reward points or other portion of the payout.

Figure 9:
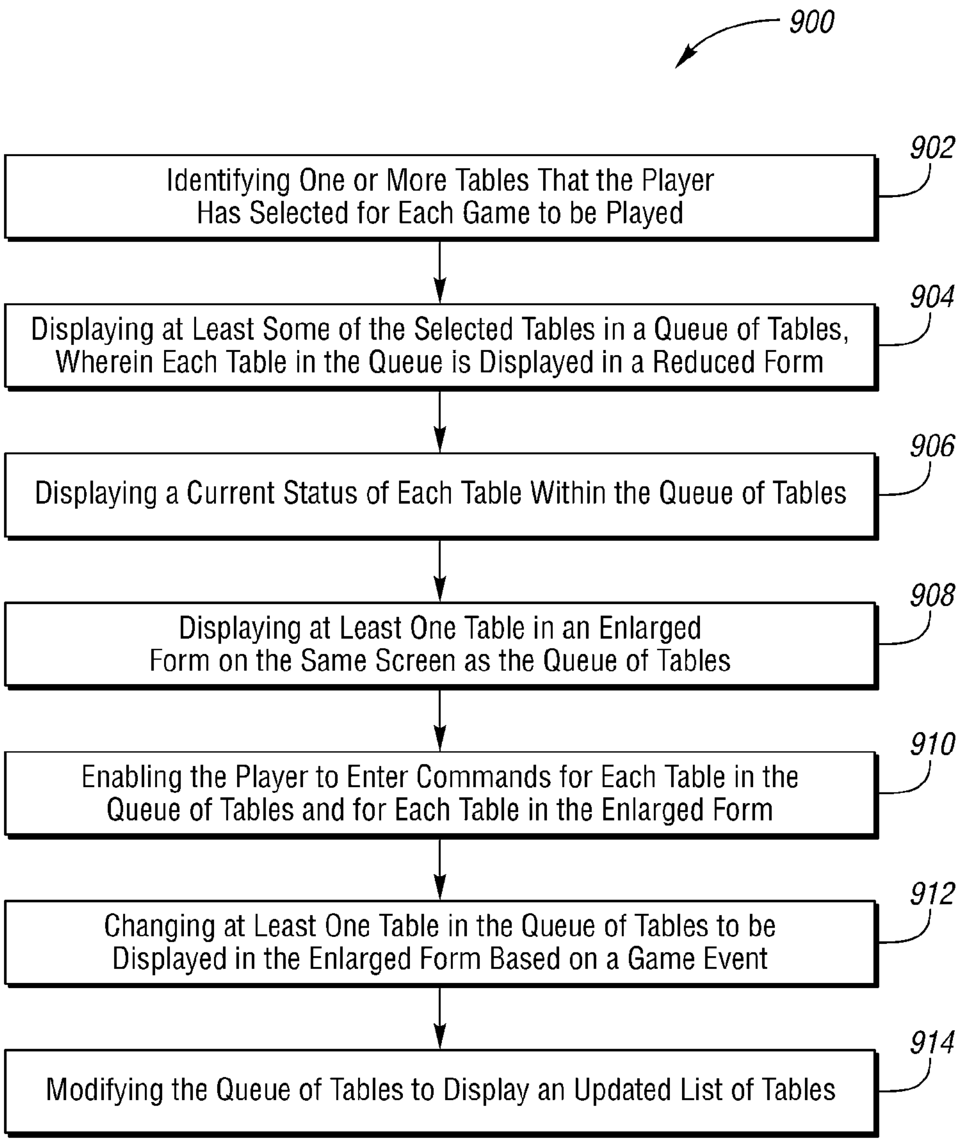
FIG. 9 is a flow diagram of a method of displaying a plurality of tables of one or more wagering games that may be used with the systems and methods described herein.

FIG. 9 is a flow diagram of an exemplary method 900 of displaying a plurality of tables of one or more wagering games that may be used with the systems and methods described herein. For example, method 900 may be used to display a plurality of poker game tables on a player's gaming device 104 to enable the player to play poker as described in FIG. 8. Alternatively, method 900 may be used to enable the player to display tables of any other wagering game as desired.

After the player and/or gaming device 104 have optionally been authenticated by game system 102 as described above, the player may select one or more games to be played and one or more tables on which to play the games. Game system 102 identifies 902 the table or tables that the player has selected for each game to be played.

Game system 102 causes gaming device 104 to display 904 at least some of the selected tables in a queue of tables. Each table in the queue is displayed in a reduced form as compared to an enlarged display or form of each table. In addition, a current status of each table within the queue of tables is displayed 906 by gaming device 104. For example, for each table in the queue, gaming device 104 may display the name of the table and/or game, the hole cards held by the player, the community cards drawn (if applicable), a betting status of each player at the table, an amount of time remaining for the player to enter a command or act at the table (sometimes referred to as a "time to act counter"), and/or any other suitable information.

As used herein, the term "reduced form" or "minimized form" refers to a display or representation of information and/or graphics in a predetermined form factor or size that is smaller and/or more compact than an enlarged form or a maximized form of the graphics and/or information. For example, a virtual poker table displayed in a reduced form may omit graphics of each player's avatar, may display a simplified, smaller graphic for the table as compared to a normal graphic of the table, and/or may display less information or information in a more compact form as compared to a normal display or an enlarged display of information associated with the table.

Gaming device 104 may also display 908 at least one additional table (of the tables selected to be played by the player) in an enlarged form on the same screen or user interface as the queue of tables. In addition, the current status of each table displayed in the enlarged form is displayed. The current status may include the information described above with reference to the reduced form in addition to other information, such as the name of each player, the chip count of each player, system messages or chat messages, the avatars for each player, and/or any other suitable information.

As used herein, the term "enlarged form" refers to a display or representation of information and/or graphics in a predetermined form factor or size that is larger than a reduced form of the graphics and/or information. For example, a virtual poker table displayed in an enlarged form may include graphics of each player's avatar, may display a larger and/or more detailed graphic for the table as compared to a reduced graphic of the table, and/or may display more information or information in a more detailed form as compared to a reduced display of information associated with the table. A table displayed in the enlarged form may fill the entire screen space of a display, or substantially the entire screen space, next to the queue of tables, or may fill a predetermined section of a grid or other portion of the screen, for example.

In one embodiment, the player is enabled 910 to enter commands for each table in the queue of tables and for each table in the enlarged form. For example, the player may enter an action to fold a hand for one or more tables displayed in the reduced form without first causing the table to be maximized (i.e., displayed in the enlarged form).

In addition, one or more tables from the queue may be changed 912 to be maximized or displayed in the enlarged form based on a game event. For example, the game event may be a selection of the table by the player, a time to act counter of the player reaching zero or a predetermined value, and/or any other suitable event. It should be recognized that the player may also minimize or otherwise cause one or more of the tables displayed in the enlarged form to be displayed in the reduced form within the queue as desired.

The queue of tables may also be modified 914 to display an updated list of tables, for example, based on a game event. For example, the queue of tables may be continuously or intermittently reordered based on a priority of actions needed to be taken by the player, an amount of time remaining in the player's time to act counter for each table, and/or any other suitable event or information. In other respects, play of the game on each table may be conducted as described above with reference to FIG. 8, for example.

Figure 10:
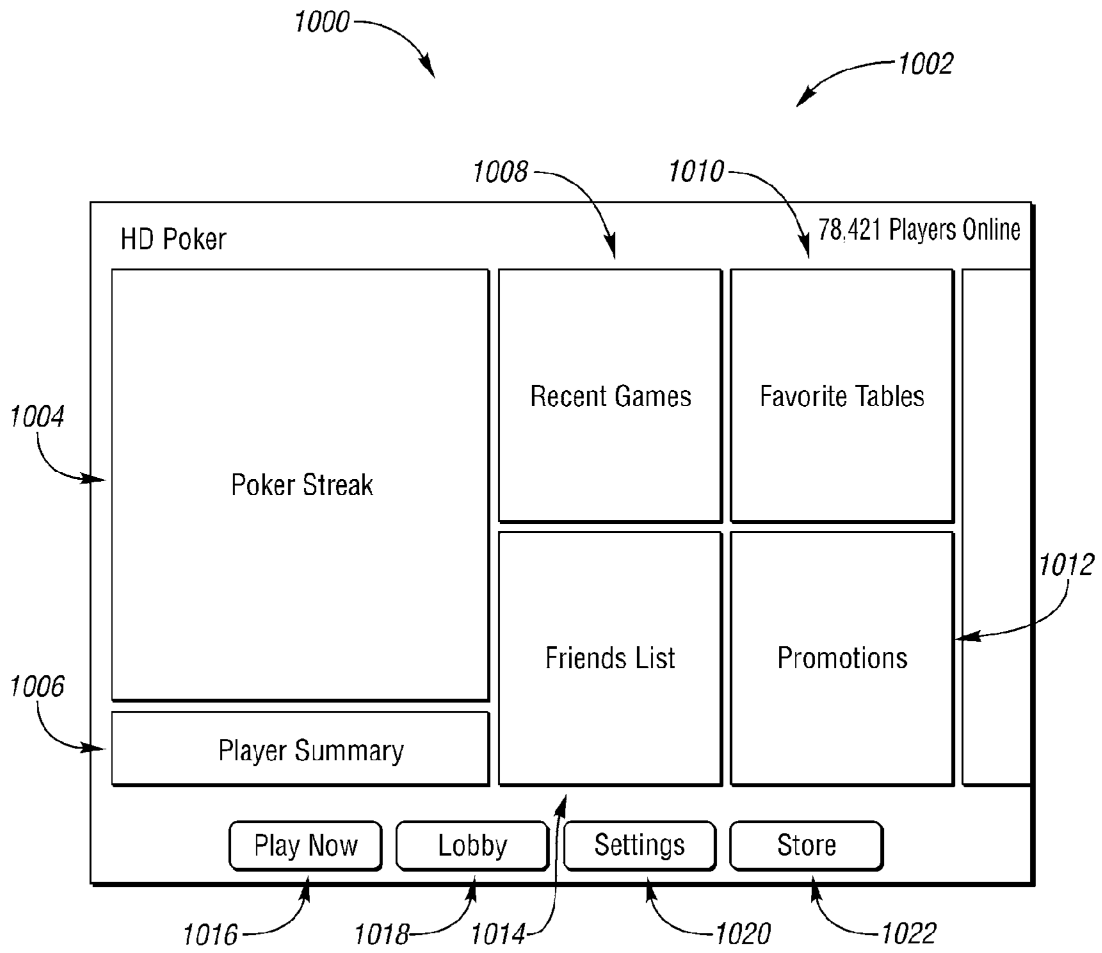
FIG. 10 is a screenshot of a user interface that may be displayed on gaming device.

FIG. 10 is a screenshot 1000 of a user interface 1002 that may be displayed on gaming device 104. For example, user interface 1002 may be displayed on gaming device 104 to enable a player using gaming device 104 to play one or more games of poker or other wagering games.

In one embodiment, user interface 1002 is the first interface displayed to the player after the player logs into game system 102 using gaming device 104. User interface 1002 may include, for example, an activity summary screen 1004, a player summary screen 1006, a recent game list 1008, a favorite table list 1010, a promotion list 1012, and a friend list 1014. In addition, user interface 1002 may include one or more icons, such as a play icon 1016, a lobby icon 1018, a settings icon 1020, and a store icon 1022. The above-described components of user interface 1002 should be viewed as illustrative only, rather than limiting. It should be recognized that additional components may be included and/or one or more of the above-described components of user interface 1002 may be omitted in some embodiments.

Activity summary screen 1004 may display a snapshot of recent activity relating to the games the player has played and/or activity of the player's friends. For example, activity summary screen 1004 may display a list of recent pots the player has won, gameplay videos or pictures (or other videos or pictures) uploaded by the player or friends of the player, achievements unlocked, tournaments scheduled to be played in, deposits and withdrawals from the player's account, invitations to one or more tables or tournaments, revenue milestones, and/or any other suitable information. Activity summary screen 1004 may be updated in real-time or may be updated on a scheduled basis.

Player summary screen 1006 may display information relating to the player's account, or any other suitable information relating to the player. For example, player summary screen 1006 may display the username of the player, the avatar representing the player, a current account balance of the player account, a current skill level of the player, a skill level meter or another indication of the player's progress towards achieving a higher skill level, or any other information.

Recent game list 1008 may display a list of recent games or hands that the player has played. For example, recent game list 1008 may display a list of games or hands the player has played within the last day, within the last week, or within another predetermined period of time. Alternatively, recent game list 1008 may display the last 5 games or hands, or another suitable number of games or hands most recently played by the player. In one embodiment, each game or hand listed in recent game list 1008 may be selected by the player (such as by using user interface device 612) to display the results and details of the selected game or hand, and/or to view a replay of the selected game or hand.

Favorite table list 1010 may display a list of tables that the player has selected as favorites. Alternatively, favorite table list 1010 may display a list of tables at which the player has most recently played in a similar manner as described above with reference to recent game list 1008. A heat map may also be used to show an amount of wagering activity and/or a speed of gameplay at each selected table. In one embodiment, each table listed in favorite table list 1010 may be selected to either enable the player to be seated at the table or to view the gameplay at the table.

Promotion list 1012 displays one or more advertisements, promotions, and/or other notifications to the player. For example, promotion list 1012 may display upcoming tournaments, celebrity events, deposit or gameplay bonuses or promotions, new features of one or more games or applications, advertisements for additional games or services, and/or any other suitable notification.

Friend list 1014 displays a list of one or more friends of the player. The friends may be identified within game system 102, such as by adding friends playing on game system 102. Additionally or alternatively, the friends may be identified or imported from a social networking site, such as Facebook®, LinkedIn®, or the like.

Play icon 1016 enables the player to quickly join a table and start playing a game. For example, when the player selects play icon 1016, game system 102 may automatically select a table based on the player's most frequently used game or table selection criteria, based on operator-selected criteria (e.g., based on the player's chip count), and/or any other suitable criteria, and seats the player at the selected table. Accordingly, play icon 1016 enables the player to start playing a game at a table by simply selecting one button.

Lobby icon 1018 enables the player to view another user interface or screen to select one or more tables to play. In one embodiment, a new user interface is presented to the player when the player selects lobby icon 1018. The new user interface may display a list or grid of tables that the player may select, and may provide a plurality of table selection criteria for each table, such as a name of the table, minimum and maximum wager amount for the table, a number of players currently playing at the table, a maximum number of players allowed at the table, and/or other suitable criteria. In one embodiment, each player is ranked by a skill level based on an amount of time played, a number of hands won, an amount of money won, and/or any other suitable criteria. In such an embodiment, the tables available to be selected by the player may be restricted to those tables having players of similar skill level. In some embodiments, players of different skill levels may play together, but the players of a lower skill level may receive "handicaps" or other benefits to compensate for playing against players of a higher skill level. The handicaps may include, for example, automatically generated gameplay hints, free gameplay or player statistics, reduced blind amounts, or any other suitable handicap. In other embodiments, the tables may not be restricted to players having similar skill levels, but rather, the player may select any table as desired and all players may play on equal footing without handicaps.

In another embodiment, tables may be grouped together or sorted based on similar gameplay criteria or characteristics. For example, some tables may be configured to enable the players to play a faster version of poker (hereinafter referred to as "fast-fold poker"). In fast-fold poker, when the player folds a hand, the player is automatically moved from the current (first) table and is automatically seated at a new (second) table having the same, or substantially the same, characteristics as the first table. For example, the first and second tables may have substantially similar wagering limits, number of players, and game type. The player may therefore experience a more exciting and fast-paced wagering game as compared to the gameplay at other tables.

The table lobby also enables the player to search for tables and/or filter tables based on selected criteria. For example, the tables may be searched and/or filtered by player skill level, wagering limits, buy-in amounts, game type, tables that friends are playing on, table name, tables that the player has been invited to, and/or any other suitable criteria. The player may also search for other player's names, such as names of friends, to find the table or tables that the player's friends are playing on, for example. If the player does not want to be found by other players, the player may set his or her profile or configuration settings to an incognito mode or another mode in which the player is not able to be found in the table lobby and/or elsewhere within the game environment. In one embodiment, if the player selects a table that a friend is playing on, the player and the friend may have an indicator representing the friendship to enable other players at the table to see that there are friends playing together.

The tables shown in the table lobby may be displayed in a scrollable list filtered by the criteria described above, or may be displayed as one or more images of the actual tables themselves. The images of the actual tables may be, in effect, a window into the gameplay at the table such that the player may view which other players are playing at the table, how much money is being wagered, how many seats are open, etc. Accordingly, the player may scroll through the images to determine which table the player wants to join, and may then select the desired table. The images may be displayed as tiles, windows, thumbnails, or any other suitable image that enables the player to view the gameplay of the table before joining the table.

In one embodiment, the table lobby may present one or more head-to-head or one-on-one poker games or tables (hereinafter referred to as "arcade mode" poker games or tables) in which the player may play against only one other competitor. The arcade mode may be at least partially styled or modeled after one or more computer or console fighting games. Accordingly, in one embodiment, a stylized or enlarged avatar for the player and for the competitor may be presented on either side of the user interface implementing the game, with the avatars facing each other. Various fighting moves or actions may be performed based on the gameplay of the poker game. For example, betting or raising during a poker hand may correspond to the avatar of the betting player throwing a punch or a kick towards the other avatar. The avatar receiving the punch or kick may block or counter if the player matches the bet or re-raises. As another example, the avatar of the player who wins a hand may deliver a knockout punch, kick, or other move to the avatar of the player who loses the hand. In one embodiment, each avatar may have a simulated health bar or other graphic that is drained or recharged based on the gameplay. The health bar may correspond to the player's chip count, or each player may have a health bar that initially corresponds to the same value or number such that each avatar starts off with the same amount of health. In another embodiment, the player may play against a sequence of computer-controlled avatars (sometimes referred to as "bots"). As each computer-controlled avatar is defeated by the player, the difficulty may increase, for example, by increasing the artificial intelligence used by the computer-controlled avatar, by decreasing a handicap of the computer-controlled avatar, by increasing the chip count of the computer-controlled avatar, and/or by any other suitable means. The player may achieve rewards for defeating each computer-controlled avatar. The above examples are merely illustrative, and it should be recognized that any other fighting characteristic or simulation may be included in addition to, or instead of, the above-described examples. Alternatively, other head-to-head variations or embodiments may be provided in which the player plays against one other player.

Settings icon 1020 enables the player to adjust one or more settings or aspects for the game, table, or player account. In one embodiment, a new user interface is presented to the player for changing the settings when the player selects settings icon 1020.

Store icon 1022 enables the player to purchase virtual objects and/or virtual currency for use in the game. In one embodiment, a new user interface is presented to the player when the player selects store icon 1022. For example, the new user interface may enable the player to purchase avatar customizations or outfits, widgets or applications for use with the game, table customizations, status upgrades (e.g., upgrading to a VIP status), additional credits or virtual currency to be used during play of the game, and/or any other suitable object, service, or status.

Figure 11:
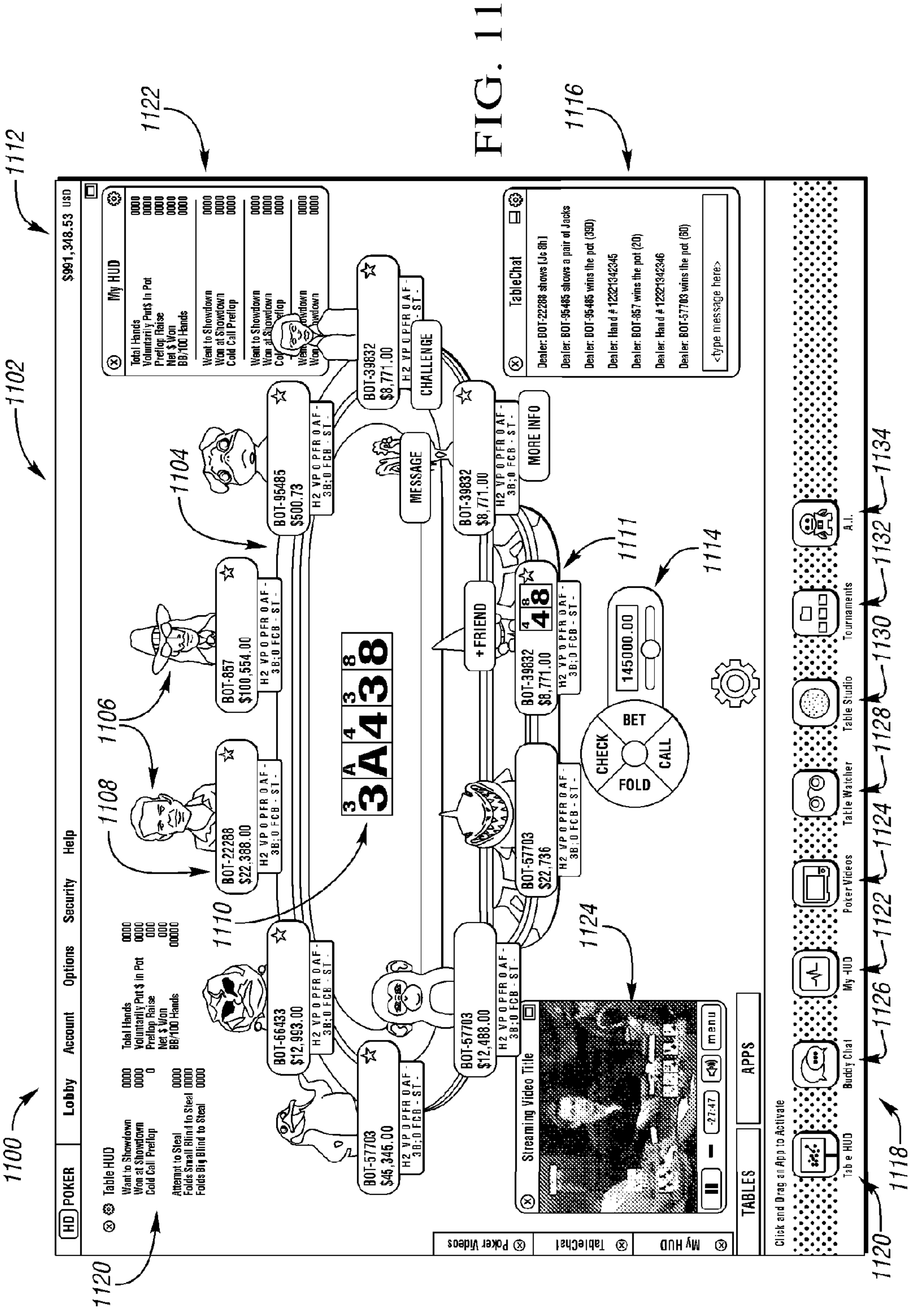
FIG. 11 is a screenshot of another user interface that may be displayed on gaming device.

FIG. 11 is a screenshot 1100 of another user interface 1102 that may be displayed on gaming device 104. For example, user interface 1102 may be displayed on gaming device 104 to enable a player using gaming device 104 to play one or more games of poker or other wagering games.

In one embodiment, user interface 1102 is displayed to the player when the player selects a table at which to play a game. For example, user interface 1102 may be displayed to the player when the player selects play icon 1016 or when the player selects a table within the lobby presented by lobby icon 1018.

User interface 1102 may include, for example, a table image 1104 representing the table selected by the player, one or more player avatars 1106, a player summary 1108 for each avatar 1106, a community card display 1110, a player card display 1111 (also referred to as a hole card display), a player account balance display 1112, an action controller 1114, a table event display 1116, and one or more widgets 1118. In addition, user interface 1102 may include a plurality of heads-up displays (HUDs), such as a table HUD 1120 and/or a player HUD 1122. A video player 1124 may also be included within user interface 1102 as desired. The above-described components of user interface 1102 should be viewed as illustrative only, rather than limiting. It should be recognized that additional components may be included within user interface 1102 and/or one or more of the above-described components of user interface 1102 may be omitted in some embodiments.

In an embodiment, table image 1104 represents the table selected by the player. Table image 1104 may be a default image provided by game system 102, or may be a customized image created by the player or based on modifications provided by the player. While table image 1104 is illustrated in a perspective view, in some embodiments, the player may rotate table image 1104 to any degree and/or may view table image 1104 from any virtual camera position.

In one embodiment, one or more advertisements and/or sponsor logos may be embedded within table image 1104, such as within the felt or top portion of table image 1104. The advertisements and/or sponsor logos may be always displayed, or may be displayed only at predetermined times, such as during a synchronized tournament break period or at a start or an end of a game or round.

Player avatars 1106 are images that represent the players playing at the table. Each avatar 1106 may be customized according to each player's preferences, or may be default images provided by game system 102, for example. In one embodiment, avatars 1106 may reflect gameplay events. For example, a simulated expression for an avatar 1106 may change to a smile or avatar 1106 may appear to celebrate if the player associated with avatar 1106 wins a hand. In one embodiment, each avatar 1106 may be a video stream or a picture of the player's actual face as provided by a webcam of gaming device 104 for example, or may be any other video stream or picture.

A player summary 1108 may be displayed for each avatar 1106. Player summary 1108 may include the username of the player associated with avatar 1106, an amount of credits or currency (sometimes referred to as a "chip count") that the player has available to wager during the game, a plurality of gameplay statistics of the player, an indication of whether another player is a friend of the player operating gaming device 104, and/or any other suitable information or image.

Community card display 1110 displays a representation of each community card dealt during the play of the hand. For example, in an embodiment in which Texas Hold 'Em is played at the table, community card display 1110 may display the flop cards, the turn card, and the river card. In one embodiment, the cards are color coordinated by suit. Alternatively, the cards may appear as standard poker cards, or may have any other suitable appearance.

Player account balance display 1112 may display a current account balance for the player. In one embodiment, the account balance may be represented as a number of credits available to the player or as an amount of currency available to the player.

Action controller 1114 may display one or more icons representative of actions available to be taken or performed by the player. For example, action controller 1114 may display a fold icon, a check icon, a call icon, a bet icon, and a bet selector icon or slider to enable the player to fold, check, call, or bet during the hand. If an action is not available to be performed, the associated icon in action controller 1114 may be grayed out and/or may be unable to be selected by the player. For example, if the player folds a hand, each icon in action controller 1114 may be grayed out and/or may be unable to be selected by the player until the next hand begins. In one embodiment, the player may control an amount bet on a hand by using a mouse wheel or similar device to increment or decrement the bet using a slider on action controller 1114. Additionally or alternatively, action controller 1114 may include buttons or other icons that enable the player to select one or more predetermined bet amounts.

Table event display 1116 presents a sequential list of gameplay event notifications associated with the table. For example, table event display 1116 may present notifications of the community cards dealt during the hand, actions taken by each player, and/or a result of the hand (e.g., who won the hand and/or the winning cards). One or more system events and/or promotions may also be displayed on table event display 1116. For example, upcoming tournaments and/or bonus deposit events may be announced on table event display 1116.

One or more widgets 1118 (sometimes referred to as "applications" or "apps") may be provided in user interface 1102 for use by the player. For example, a thumbnail icon for each available widget 1118 may be displayed in a portion of user interface 1102, such as in a tab of user interface 1102 at the bottom of user interface 1102. Each thumbnail icon launches a widget 1118 associated therewith when the player selects the icon. Non-limiting examples of widgets 1118 provided by user interface 1102 may include, for example, a table HUD 1120 (described herein), a buddy chat 1126 (for exchanging messages with friends), a player HUD 1122 (described herein), a video player 1124 (described herein), a table watcher 1128 (for viewing gameplay on one or more other tables), a table studio 1130 (for customizing one or more tables), a tournament viewer 1132 (for viewing details of upcoming tournaments or for viewing aspects of tournaments currently being played), an artificial intelligence viewer 1134 (for viewing detailed statistics of the player's gameplay), and/or any other suitable application. Widgets 1118 may be closed when desired and also may be resized and moved to different locations in user interface 1102. Additional widgets 1118 may be purchased or otherwise received from an application store provided by game system 102.

Widgets 1118 may be viewed and executed on gaming device 104 and/or on any other device operated by the player. For example, a first widget 1118 or group of widgets 1118 may be executed on gaming device 104 and a second widget 1118 or group of widgets 1118 may be executed on a cell phone, a tablet computing device, or any other suitable device. In one embodiment, the player may select a widget 1118 within user interface 1102 and may select a command to transfer widget 1118 to another player device.

In one embodiment, a note-taking widget 1118 may be provided on user interface 1102 to enable the player to take notes on various aspects of the game and/or on the player's competitors. The notes may be saved to gaming device 104 or to another computer and may be accessed at a later time within user interface 1102. In one embodiment, the player may rank or rate the skill or proficiency of each competitor using the note-taking widget 1118. Avatars 1106 for each competitor the player has ranked or rated may be highlighted, outlined, colored, or otherwise differentiated based on the ranking or rating. For example, if the player has rated a competitor as having a high skill at playing poker (e.g., the competitor is a strong player), avatar 1106 for the competitor may be colored or highlighted in red. Likewise, is the player has rated a competitor as having a low skill at playing poker (e.g., the competitor is a weak player), avatar 1106 for the competitor may be colored or highlighted in green. It should be recognized that any suitable color and/or ranking may be used in other embodiments. Alternatively, the player's ranking or rating of competitors may be displayed in other ways, such as by displaying a textual indicator above the head of each ranked or rated avatar 1106 or by any other suitable means.

Table HUD 1120 may provide real-time or near real-time feedback and/or statistics of the player's gameplay at the table. In an embodiment, table HUD 1120 includes a plurality of statistics relating to gameplay at the table, such as a number of hands played by the player at the table, a number of times that the player engaged in a "showdown" with another player, a number of times the player won the showdown, and the like. In one embodiment, the player may customize the information displayed in table HUD 1120 to add, delete, and/or replace the information displayed therein.

Player HUD 1122 may provide real-time or near real-time feedback and/or statistics of the player's overall gameplay (i.e., the player's gameplay over the course of all games and/or tables played by the player). In an embodiment, player HUD 1122 includes a plurality of statistics relating to the overall gameplay of the player, such as a total number of hands played by the player, a total number of times that the player engaged in a "showdown" with another player, a total number of times the player won the showdown, and the like. In one embodiment, the player may customize the information displayed in player HUD 1122 to add, delete, and/or replace the information displayed therein.

Video player 1124 enables the player to view one or more videos within user interface 1102 while playing the game. The videos may include videos of previously played or currently played poker games, instructional videos, interviews, tournament gameplay or results, news reports, and/or any other suitable videos. The videos may be streamed or otherwise received from a video library hosted by another site, or may be received from a video library hosted within game system 102. In one embodiment, the videos may be purchased within the store operated by game system 102. Alternatively, the player may sign up for a subscription-based service that provides at least some videos to the player based on the subscription. The videos may be resized and may be moved to different positions within user interface 1102 as desired. In addition, the videos may be viewed on another device operated by the player (such as a cell phone or a tablet computing device, for example) in addition to, or instead of, gaming device 104.

Figure 12:
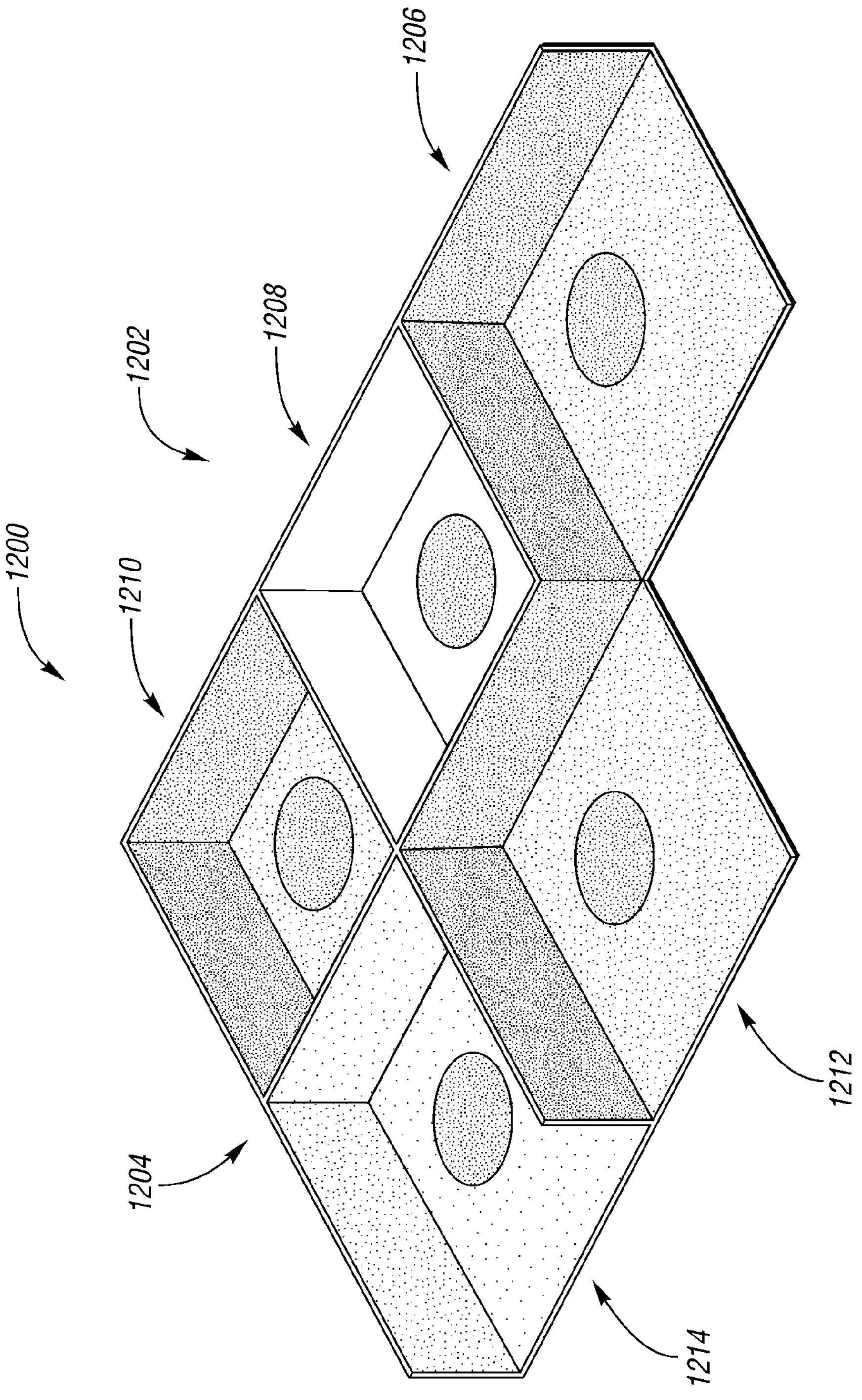
FIG. 12 is a screenshot of another user interface that may be displayed on gaming device.

FIG. 12 is a screenshot 1200 of another user interface 1202 that may be displayed on gaming device 104. For example, user interface 1202 may be displayed on gaming device 104 to enable a player using gaming device 104 to play a plurality of games of poker or other wagering games at the same time (sometimes referred to as "multitabling").

If the player selects a plurality of tables to play at the same time, user interface 1202 may be presented to the player to display the tables in a grid format (referred to herein as a table grid 1204). Alternatively, user interface 1202 may display the tables in any suitable arrangement or form. In one embodiment, the ability to play multiple tables at the same time may be initially locked to players. In such an embodiment, the player may gain the ability to multitable upon receiving an achievement or other unlocking criteria. For example, the player may receive the achievement after playing a predetermined number of hands, by winning a predetermined number of hands, by purchasing the achievement, by reaching a predetermined skill level, or the like. The player may alternatively gain the ability to multitable upon registering as a VIP member, by referring a predetermined number of players to game system 102 or the game, and/or by any other suitable means. The player may also receive achievements that unlock the ability to play on additional tables after demonstrating the ability to play on a lower number of tables. For example, the player may unlock the ability to play on 8 tables at the same time after playing a predetermined number of games on 4 simultaneous tables.

Other achievements may be unlocked as well in certain embodiments. For example, a table ownership achievement may be unlocked in a similar manner as described above. The table ownership achievement enables the player to control and customize one or more tables at which other players may play. The table ownership achievement may enable the player to receive some or all of the rake that is associated with each table controlled by the player. The player may invite other players to play at the table or tables, may link to the table or embed the table in third party websites or advertisements, may brand the table with a logo or image selected by the player, and/or may set up and run one or more public or private tournaments on the table or tables, for example. Other players may rate and/or rank the player's table, other tables, and/or any other aspects of the games, tables, and user interfaces.

In another embodiment, other rewards may be provided to the player for receiving predetermined achievements and/or milestones. For example, if the player reaches a next skill level, the player may receive an award, such as a free drink certificate redeemable at a casino or other establishment, a free room, a ticket to a show, a discount for one of the aforementioned, a predetermined number of reward points redeemable at a reward store or catalog, and/or any other suitable award.

Accordingly, table grid 1204 displays the tables selected by the player. In the example shown in FIG. 12, five tables are shown: a first table 1206, a second table 1208, a third table 1210, a fourth table 1212, and a fifth table 1214. However, it should be recognized that any suitable number of tables may be included within table grid 1204.

Table grid 1204 may graphically indicate a status of the gameplay on each table. For example, a table may be colored or highlighted in a first color, such as red, if urgent action is required by the player for that table (e.g., if it is the player's turn to act in the game and the player's time to act counter has run out or is about to run out). A table may be colored or highlighted in a second color, such as green, if action is required on the table but the action is not urgently required (e.g., if it is the player's turn to act in the game but the player's time to act counter has not run out). A table may be colored or highlighted in a third color, such as gray (or may be grayed out), if no action is required on the table (e.g., if it is not the player's turn to act or if gameplay has not commenced on the table). In another embodiment, game system 102 may transmit a message or an alert to the player on gaming device 104 or another device (such as a cell phone) when action is required at one or more tables. The message or alert may be a popup message, a window that opens up, an SMS message, or any other suitable message or alert. The player may select one of the tables in table grid 1204 to view the gameplay at the table and to perform actions therein. In one embodiment, user interface 1102 (shown in FIG. 11) is presented to the player when the player selects a table in table grid 1204.

In one embodiment, the player may use a plurality of devices to view and/or control the table or tables provided by game system 102. More specifically, while the game itself and/or the tables of table grid 1204 may be displayed on a first device, such as gaming device 104, other aspects of the game and/or tables may be displayed or provided to a second device, such as a cell phone, a tablet computing device, or a desktop or laptop computer. For example, one or more widgets 1118 or other applications may be provided on the second device to control the gameplay of one or more tables on gaming device 104. For example, the second device may connect to the first device wirelessly (e.g., through Bluetooth, Wifi, or another suitable protocol), and/or the second device may connect directly to game system 102 to control the gameplay of gaming device 104 through game system 102. Likewise, one or more HUDs may be provided on the second device to enable the second device to act as a secondary viewing screen for gaming device 104 and/or the games played thereon.

As one illustrative example, gaming device 104 may be a desktop computer that the player uses to access game server 102 over the Internet to play a game of online poker. The player may also use a mobile device, such as a tablet computing device or a cellular phone, to connect to gaming device 104 to control the gameplay of the game on gaming device 104 and/or to view data associated with the game. The player may cause one or more widgets to be moved to, or instantiated on, the mobile device to enable the player to access the widgets while moving around or while away from gaming device 104. Additionally or alternatively, a portion of the user interface or screen presented by the game on gaming device 104 may be extended or mirrored onto the mobile device. Accordingly, if gaming device 104 is displaying one or more tables at which the player is playing the game, the mobile device may also display one or more of the tables to enable the player to enter actions (e.g., fold, bet, call, etc.) on the tables using the mobile device.

Figure 13:
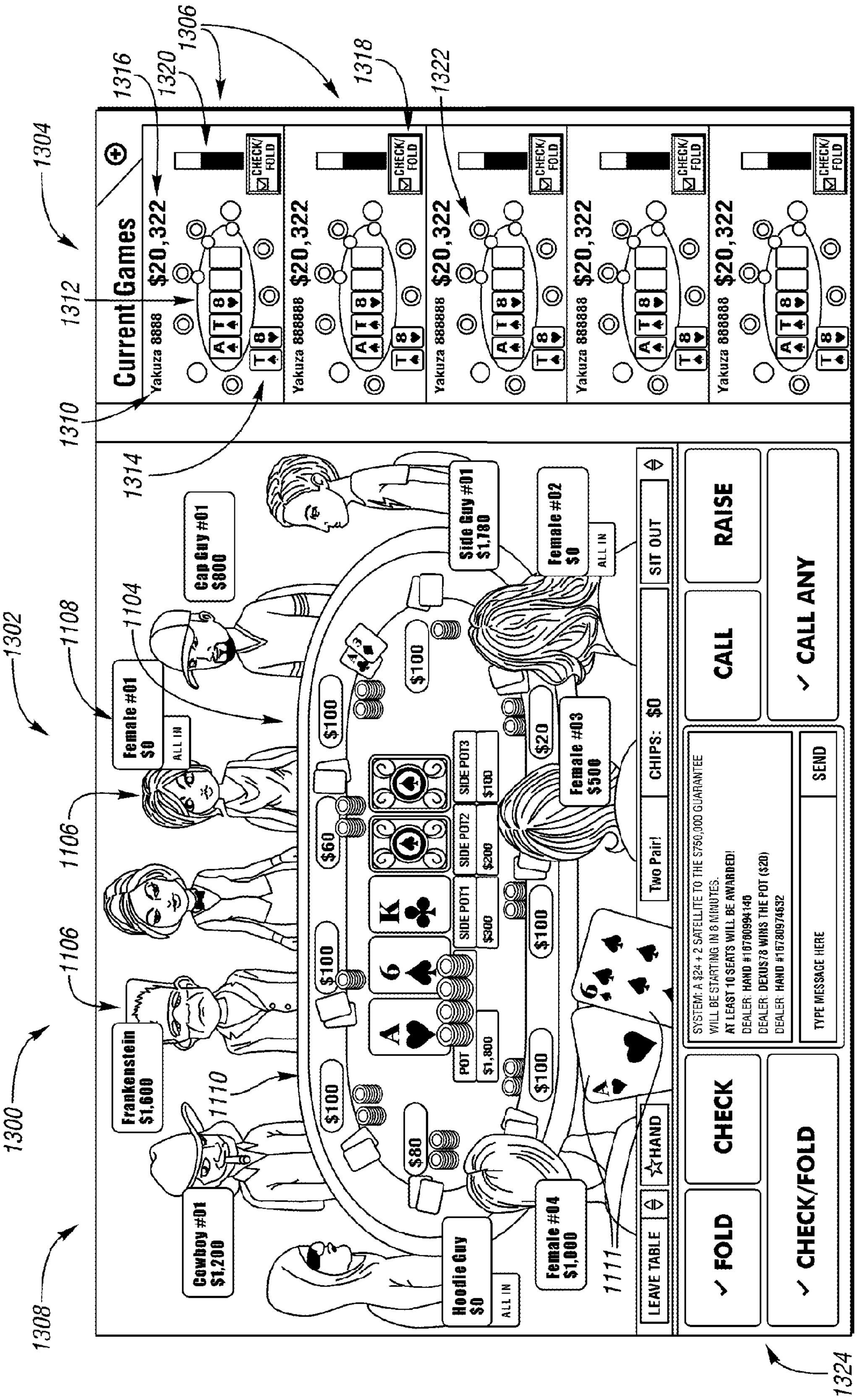
FIG. 13 is a screenshot of another user interface that may be displayed on gaming device.

FIG. 13 is a screenshot 1300 of another user interface 1302 that may be displayed on gaming device 104. For example, user interface 1302 may be displayed on gaming device 104 to enable a player using gaming device 104 to play a plurality of games of poker or other wagering games at the same time. It should be recognized that user interface 1302 may be presented as an alternative to user interface 1202 (shown in FIG. 12).

In an embodiment, rather than displaying a table grid 1204 as illustrated in FIG. 12, user interface 1302 may display a queue 1304 of tables to enable the player to play a plurality of games at the same time (i.e., to multitable). While queue 1304 is illustrated as being positioned on the right side of user interface 1302 in FIG. 13, it should be recognized that queue 1304 may be positioned in any suitable location within user interface 1302.

Queue 1304 displays a plurality of tables in a reduced form 1306 as described above with reference to FIG. 9. In addition, one or more tables may be displayed in user interface 1302 in an enlarged form 1308 as described in FIG. 9. For example, four tables may be displayed in enlarged form 1308 as a grid, or any suitable number of tables may be displayed in enlarged form 1308 in any arrangement. Tables displayed in reduced form 1306 are sometimes referred to as inactive or minimized tables, and tables displayed in enlarged form 1308 are sometimes referred to as active or maximized tables. In one embodiment, a player may select one or more tables to always be displayed in enlarged form 1308 (i.e., the player may "pin" one or more tables to a portion of user interface 1302 reserved for the active tables).

Each table displayed in user interface 1302 and/or queue 1304 may be a different type of game and/or may be from a different virtual poker room as compared to each other table in user interface 1302 and/or queue 1304. For example and without limitation, a first table in queue 1304 may be a no-limit Texas Hold 'Em poker game played from a first poker room, a second table in queue 1304 may be a pot-limit Omaha poker game played from a second poker room, and a third table in queue 1304 may be an Open Face Chinese Poker game played from a third poker room.

In an embodiment, each table in queue 1304 displays a plurality of table elements in a reduced form. The table elements may include, for example, a table name 1310, a plurality of community cards 1312 for the table, a plurality of hole cards 1314 for the player, a chip count 1316 for the player, an action controller 1318 for the player, a time to act counter display 1320 for the player, and a status display 1322 for the player and the players' competitors at the table.

Action controller 1318 may present a limited or reduced set of controls to the player as compared to an action controller 1324 of enlarged form 1308. For example, action controller 1318 may only include a check/fold box or icon that enables the player to fold the hand directly from queue 1304 (without maximizing the table) if another player bets during the hand. Alternatively, action controller 1318 may include any suitable control and/or icon as desired.

Time to act counter display 1320 may display an amount of time remaining for the player to take action on each table in queue 1304. For example, time to act counter display 1320 may be represented as a bar that progressively empties as the time remaining in the player's time to act counter decreases. Alternatively, time to act counter display 1320 may be represented as a countdown timer or any other suitable display. In one embodiment, the player may select time to act counter display 1320 or may hover a mouse or other pointer over time to act counter display 1320 to display an amount of seconds and/or minutes remaining in the player's time to act counter.

Status display 1322 may display a representation of the gameplay status of the player and of each competitor of the player playing at the table. The gameplay status represented by status display 1322 may include, without limitation, a representation of the seat position the player or competitor is in (e.g., small blind position, big blind position, etc.), whether the player or competitor has folded the hand, and/or whether it is the player's or competitor's turn to act during the hand. For example, the competitors who have folded may be represented on status display 1322 with red circles and the competitors who have not folded may be represented on status display 1322 with green circles. If the player has folded, in one embodiment, the player's hole cards 1314 may be grayed out or removed from the display of the table. Alternatively, any suitable representation may be used to display the status of the player and the player's competitors.

In one embodiment, the tables displayed in queue 1304 are ordered or sorted based on at least one predetermined criterion. For example, the tables may be ordered or sorted based on a priority of the actions needed to be taken on each table. In one embodiment, the table at the top of queue 1304 may be the table that has the highest priority action that needs to be taken and the table at the bottom of queue 1304 may be the table that has the lowest priority action that needs to be taken by the player. For example, the priority of the actions may be based on the amount of time remaining in the player's time to act counter for each table such that the table at which the least amount of time remaining in the time to act counter has the highest priority, and the table at which the most amount of time remaining in the time to act counter has the lowest priority. In one embodiment, the tables in queue 1304 may flash or may be otherwise emphasized in accordance with the amount of time remaining on the time to act counter associated with each table. For example, the tables may start flashing at a slow rate (such as about once every second) and may flash more quickly as the time to act counter runs down. Alternatively, the tables may start flashing once the time to act counter reaches a predetermined value. The player may disable the reordering of the tables in queue 1304, for example, by selecting an appropriate option in a gameplay or table configuration setting interface.

In addition, the player can select a table in queue 1304 to cause the table to be switched from reduced form 1306 to enlarged form 1308 (i.e., maximized). A table in enlarged form 1308 may thereby be replaced by the selected table and may be minimized or switched to reduced form 1306 and placed in queue 1304. In one embodiment, if the player enters an action on the maximized table (the table in enlarged form 1308), the table is then minimized into the bottom (or lowest priority) position in queue 1304, or to another position in queue 1304, and the table having the highest priority (e.g., the table in the top position of queue 1304) may be automatically maximized into enlarged form 1308. The player may also select an icon or may enter another suitable command to minimize a previously maximized table such that the table is placed into queue 1304. In one embodiment, tables that the player is "sitting out" (i.e., the player has withdrawn from active play on the table but retains his or her seat at the table) are placed at the bottom of queue 1304 and are not reprioritized until the player "sits back in" at the table (i.e., resumes active play at the table).

As the priority of each table may change over time, and as the player may act on each table in any order (e.g., by maximizing a table and/or by folding a hand of a table in queue 1304), queue 1304 may continually be updated and the tables may be automatically reordered or repositioned to reflect the ranked priorities. Alternatively, tables may only be ranked or prioritized when it becomes the player's turn to act on the table. Tables that are minimized by the player may be placed at the bottom of queue 1304 (or at another suitable position) and may remain in that position until it becomes the player's turn to act. While the priorities of the tables have been described herein as being based on an amount of time remaining in the player's time to act counter for each table, it should be recognized that the priorities may be based on any suitable criteria.

In one embodiment, if a player folds a hand at a table, the table may be placed or re-positioned in queue 1304 with the following position or priority:

$$\text{Position}=P_{street}+(P_{hand}\times N_{street})$$

where $P_{street}$ is the number of players remaining to act on the current street, $P_{hand}$ is the number of players remaining in the hand, and $N_{street}$ is the number of streets remaining in the hand. A "street" refers to a betting round or a turn in which each player remaining in the hand is required to take an action, such as betting, folding, etc. before the next card is dealt.

For a hand that is not folded at a table (e.g., if the player minimizes the table without folding), the table may be placed or repositioned in queue 1304 with the following priority:

$$\text{Position}=P_{street}+P_{next}$$

where $P_{next}$ is the number of players who will act ahead of the player during the next street.

Figure 14:
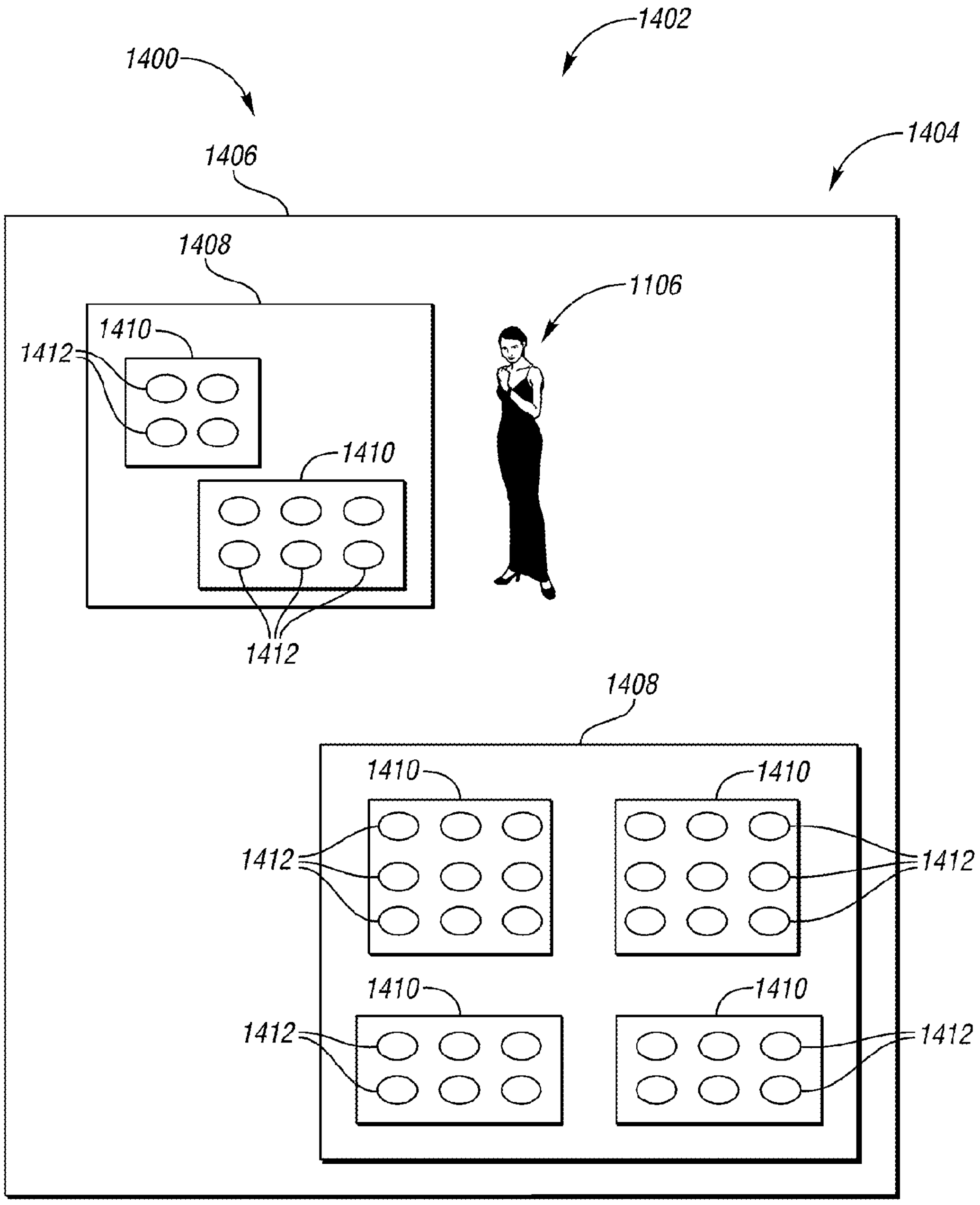
FIG. 14 is a screenshot of a user interface that may be presented to a player of a wagering game.

FIG. 14 is a screenshot 1400 of a user interface 1402 that may be presented to a player. More specifically, in an embodiment, user interface 1402 may display a three-dimensional (3D) virtual gaming environment 1404 to the player on gaming device 104 or on a virtual reality (VR) device 502 (shown in FIG. 5).

In an embodiment, virtual gaming environment 1404 is organized into one or more virtual cities or regions 1406 that have one or more virtual casinos 1408 or other gaming establishments. Each virtual casino 1408 may include one or more poker rooms 1410 or other gaming areas, and each poker room 1410 may include any suitable number of poker tables 1412. In embodiments in which a VR device 502 is used, all aspects of virtual gaming environment 1404 may be rendered in 3D with a field of view to enable the player to feel immersed within environment 1404.

Each city or region 1406 may optionally be modeled, or partially modeled, after one or more real cities or regions, such as Las Vegas, Macau, Monte Carlo, Singapore, and/or any other suitable city or region. Accordingly, an avatar 1106 of the player may move throughout city or region 1406 to move between casinos 1408, for example, and/or to experience virtual gaming environment 1404.

Casinos 1408 may optionally be modeled, or partially modeled, after one or more real casinos in certain embodiments. Each casino 1408 may include a plurality of poker rooms 1410 and may also include other virtual games or gaming areas, such as slot machines, blackjack, roulette, baccarat, bingo, keno, and the like.

Each poker room 1410 may include any suitable number of poker tables 1412 as desired. Since casino 1408 and rooms 1410 are virtual constructs without physical constraints or size limitations, it should be recognized that hundreds, thousands, or more tables 1412 may be included in each room 1410 if desired.

Tables 1412 may be implemented in a similar manner as described above with reference to FIGS. 7-13, for example. In one embodiment, when avatar 1106 associated with the player enters a room 1410, tables 1412 in that room 1410 may be displayed to the player in the form of a table lobby described above, or may be viewed in 3D as if the player was actually standing in the room viewing the tables in person. The player may select a table 1412, and may be seated at the selected table 1412 to play the game offered thereon.

Avatar 1106 may be moved through the virtual gaming environment by the player, for example, using gaming device 104, VR device 502, and/or other suitable devices and/or accessories. Accordingly, the player may enter different cities or regions 1406, casinos 1408, and/or rooms 1410 by virtually moving avatar 1106 into the respective city or region 1406, casino 1408, or room 1410. A field of view presented to the player may correspond to the position and/or orientation of avatar 1106. For example, the player may view the virtual gaming environment from the point of view of behind and above avatar's 1106 head or shoulder (sometimes referred to as an "over-the-shoulder (OTS)" point of view), from a first person's point of view with respect to avatar 1106 such that the player views the virtual gaming environment as it would appear through the eyes of avatar 1106. Alternatively, the player may view the virtual gaming environment from a top-down or plan view of the area surrounding avatar 1106, and/or any other point of view. The player may switch to different points of view, or may rotate or tilt the point of view as desired. As such, the player may virtually look around cities or regions 1406, casinos 1408, rooms 1410, and/or tables 1412 as desired.

Other accessories and/or sensors associated with gaming device 104 and/or VR device 502, such as one or more accelerometers, gyroscopes, magnometers, and the like, may be used to detect the player's movements and translate the movements into the virtual gaming environment. For example, the sensors may detect the player moving his or her head while wearing VR device 502, and avatar 1106 and/or the point of view may be moved accordingly to look around the environment. In addition, the sensors may detect the player's leg or foot movements and avatar 1106 and/or the point of view may be moved accordingly in the direction that avatar 1106 is facing, for example. The sensors may also detect hand movements of the player to enable the player to enter commands into the environment, such as to fold the hand, to bet a desired amount, to call, to check, and/or to perform any other suitable action within the environment.

In one embodiment, different casinos 1408 and/or rooms 1410 may be owned and/or operated by different entities. In such an embodiment, a rake may be established for each casino 1408 and/or room 1410 and may be allocated or paid to the entity controlling the casino 1408 and/or room 1410. If the player virtually moves from a first casino 1408 or room 1410 to a second casino 1408 or room 1410, the rake may be switched or apportioned from a first entity owning or operating the first casino 1408 or room 1410 to a second entity owning or operating the second casino 1408 or room 1410.

Virtual gaming environment 1404 may also be used with other games or applications other than poker or in addition to poker. For example, casinos 1408 may include virtual slot machines and/or other games that the player may interact with. The player may virtually "pull" a slot machine lever using VR device 502 and/or gaming device 104 to play a slot game (e.g., by detecting the player's hand and/or arm movements representative of the pulling of the slot machine lever), may virtually throw a pair of dice in a virtual craps game using VR device 502 and/or gaming device 104 (e.g., by detecting the player's hand and/or arm movements representative of the throwing of the dice), and/or may play any other game within virtual gaming environment 1404.

The systems, methods, and examples described herein should be viewed as illustrative rather than limiting. For example, while the embodiments described herein refer to a game of poker, it should be recognized that the systems and methods described herein may be used with any suitable wagering game.

Unless otherwise specified, "a" or "an" means one or more of a referenced object or step. Furthermore, unless otherwise specified, each method described herein is not limited to the order in which the steps of each method are described or introduced. Rather, the steps may be rearranged in any suitable order and/or may be combined with steps of other methods as desired. In addition, each embodiment and/or figure described herein may be combined with, or modified to include, aspects or components of any other embodiment and/or figure unless otherwise specified.

This written description uses examples to describe embodiments of the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A game system for providing one or more wagering games, said game system comprising:

a game server configured to connect to at least one gaming device over a network, said game server comprising at least one processor configured to provide at least one wagering game to a player using the at least one gaming device, wherein each wagering game is played by a plurality of players at a virtual table who are dealt a plurality of cards to form a hand, and in which the hand satisfying a winning criterion is determined to be a winning hand; and at least one non-relational database configured to be connected to said game server, said at least one database further configured to store a state of the hands of each table as a plurality of document-oriented datasets, wherein each document-oriented database includes a semi-structured encapsulation of data using a non-relational database architecture.

2. The game system of claim 1, wherein said at least one non-relational database is further configured to store a state of each table as at least one document-oriented dataset.

3. The game system of claim 1, further comprising an authentication token that is used to authenticate a gaming device with said game system.

4. The game system of claim 3, wherein said game system is further configured to associate a player identifier, a network socket identifier, and a table identifier with the authentication token.

5. The game system of claim 4, wherein said game system is further configured to:

detect that the gaming device has been disconnected from said game system;

detect that the gaming device has been reconnected to said game system after the disconnection; and automatically re-authenticate the gaming device with said game system without requiring the player to input authentication information.

6. The game system of claim 5, wherein, upon re-authenticating the gaming device with said game system, said game system is further configured to:

automatically connect the gaming device to a player account associated with the player identifier;

automatically seat an avatar of the player at a table associated with the table identifier; and automatically restore a state of the gameplay at the table.

7. The game system of claim 1, further comprising at least one application that is selectable by the player to be displayed on a user interface of the gaming device operated by the player.

8. The game system of claim 7, wherein the application may be transferred from the gaming device to another device operated by the player such that the application is displayed on the other device.

9. The game system of claim 8, wherein the other device is a mobile device operated by the player.

10. The game system of claim 7, wherein the application is a note-taking application that enables the player to rank competitors who are playing against the player at a table.

11. The game system of claim 10, wherein the player and each competitor is represented within the game using a respective avatar, and wherein the avatar of each competitor is marked based on the rank selected by the player for each competitor.

12. The game system of claim 1, wherein said game server is further configured to enable the player to play the at least one wagering game on a plurality of tables at the same time.

13. The game system of claim 12, wherein said game server is further configured to enable the player to play a first wagering game on a first table at the same time that the player plays a second wagering game on a second table, wherein the first wagering game is a different game type than the second wagering game.

14. The game system of claim 12, wherein at least some of the plurality of tables are displayed on the gaming device in a minimized form in a queue of tables.

15. The game system of claim 14, wherein at least one of the plurality of tables is displayed on the gaming device in a maximized form along with the queue of tables.

16. The game system of claim 15, wherein said game system enables the player to enter an action on each table in the queue of tables.

17. The game system of claim 16, wherein said game system enables the player to fold a hand on any of the tables in the queue of tables.

18. The game system of claim 16, wherein each table in the queue of tables is ordered based on a priority of action required by the player at each table.

19. The game system of claim 18, wherein the table with the highest priority in the queue of tables is displayed in the maximized form.

20. The game system of claim 18, wherein a position of the table in the queue of tables is re-determined each time the player enters an action on the table.

21. The game system of claim 15, wherein each table in the queue of tables displays a gameplay status of the table.

22. The game system of claim 21, wherein the gameplay status includes a plurality of community cards that have been dealt at the table, one or more hold cards that have been dealt to the player, and a betting status of each competitor of the player at the table.

23. The game system of claim 1, wherein said game system is configured to cause at least one advertisement to be displayed on at least one of the tables during a first period of time but not during a second period of time.

24. The game system of claim 23, wherein the first period of time includes a synchronized break period of the tournament, and the second period of time includes a period in which the tournament gameplay occurs.

25. The game system of claim 1, wherein said game system issues a biometric challenge that must be passed for the player to be enabled to play the game.

26. The game system of claim 25, wherein said game system randomly selects the biometric challenge from a predetermined group of biometric challenges.

27. The game system of claim 1, further comprising a first plurality of virtual tables positioned within a first virtual poker room and a second plurality of virtual tables positioned within a second virtual poker room.

28. The game system of claim 27, wherein a portion of the money received from the gameplay on the tables of the first virtual poker room is credited to an owner or operator of the first virtual poker room, and a portion of the money received from the gameplay on the tables of the second virtual poker room is credited to an owner or operator of the second virtual poker room.

29. The game system of claim 28, wherein the first virtual poker room is provided within a first virtual casino and the second virtual poker room is provided within a second virtual casino.

30. The game system of claim 29, wherein the player is enabled to cause an avatar representative of the player to be moved from the first virtual casino to the second virtual casino to play one or more games within the second virtual casino.

31. The game system of claim 30, wherein the player is enabled to operate a virtual reality device to input gameplay commands for playing one or more games at the tables of the first plurality of tables or the second plurality of tables.

32. The game system of claim 31, wherein a virtual field of view of at least one table of the first plurality of tables or the second plurality of tables is rendered by said game system to display the at least one table to the player using the virtual reality device.

33. The game system of claim 1, further comprising a random number generator configured to generate a plurality of random numbers for use in selecting the cards used in the hands.

34. The game system of claim 33, wherein the random number generator uses a nature-based random number generator to select the random numbers.

35. The game system of claim 1, wherein said game system enables the player to use a secondary device to control the gameplay of at least one game presented on the gaming device.

36. The game system of claim 1, wherein said game system is configured to provide one or more achievements that may be earned by the player to unlock features of the game, and wherein at least one of the achievements enables the player to play at least one game on a plurality of tables at the same time.

37. The game system of claim 36, wherein at least one of the achievements enables the player to customize aspects of at least one table and to invite other players to play one or more wagering games on the at least one table.

38. The game system of claim 1, wherein said game server is configured to provide a wagering game tournament in which a plurality of players at a plurality of tables are enabled to participate, said game server is further configured to select a required bet amount for each hand to control a time at which the tournament ends.

39. The game system of claim 1, said game server is configured to provide a wagering game tournament in which a time bank is assigned to each player representing a total amount of time that the player may act during the wagering game tournament, and wherein said game server removes the player from the wagering game tournament if the player's time bank reaches zero or if an amount of chips that the player has in play during the wagering game tournament reaches zero.

40. The game system of claim 39, wherein said game server is configured to redistribute a first player's remaining time in the first player's time bank to at least one other player in the wagering game tournament if the first player's chips reach zero.

41. A method of providing one or more wagering games, said method comprising:

connecting at least one gaming device to a game server over a network;

providing, by the game server, at least one wagering game to a player using the at least one gaming device, wherein each wagering game is played by a plurality of players at a virtual table who are dealt a plurality of cards to form a hand, and in which the hand satisfying a winning criterion is determined to be a winning hand;

connecting at least one non-relational database to the game server; and storing a state of the hands of each table as a plurality of document-oriented datasets within the at least one non-relational database, wherein each document-oriented dataset includes a semi-structured encapsulation of data using a non-relational database architecture.

42. The method of claim 41, further comprising storing a state of each table as at least one document-oriented dataset in the at least one non-relational database.

43. The method of claim 41, further comprising authenticating a gaming device with the game system using an authentication token.

44. The method of claim 43, further comprising associating a player identifier, a network socket identifier, and a table identifier with the authentication token.

45. The method of claim 44, further comprising:

detecting that the gaming device has been disconnected from the game system;

detecting that the gaming device has been reconnected to the game system after the disconnection; and automatically re-authenticating the gaming device with the game system without requiring the player to input authentication information.

46. The method of claim 45, wherein, upon re-authenticating the gaming device with the game system, said method further comprises:

automatically connecting the gaming device to a player account associated with the player identifier;

automatically seating an avatar of the player at a table associated with the table identifier; and automatically restoring a state of the gameplay at the table.

47. The method of claim 41, further comprising providing at least one application that is selectable by the player to be displayed on a user interface of the gaming device operated by the player.

48. The method of claim 47, further comprising transferring the at least one application from the gaming device to another device operated by the player.

49. The method of claim 48, wherein the other device is a mobile device operated by the player, said method comprising displaying the at least one application on the mobile device.

50. The method of claim 47, further comprising enabling the player to rank competitors who are playing against the player at a table using the at least one application.

51. The method of claim 50, further comprising representing the player and each competitor within the game using a respective avatar, and marking the avatar of each competitor based on the rank selected by the player for each competitor.

52. The method of claim 41, further comprising enabling the player to play the at least one wagering game on a plurality of tables at the same time.

53. The method of claim 52, further comprising enabling the player to play a first wagering game on a first table at the same time that the player plays a second wagering game on a second table, wherein the first wagering game is a different game type than the second wagering game.

54. The method of claim 52, further comprising displaying at least some of the plurality of tables on the gaming device in a minimized form in a queue of tables.

55. The method of claim 54, further comprising displaying at least one of the plurality of tables on the gaming device in a maximized form along with the queue of tables.

56. The method of claim 55, further comprising enabling the player to enter an action on each table in the queue of tables.

57. The method of claim 56, further comprising enabling the player to fold a hand on any of the tables in the queue of tables.

58. The method of claim 56, further comprising ordering each table in the queue of tables based on a priority of action required by the player at each table.

59. The method of claim 58, further comprising displaying the table with the highest priority in the queue of tables in the maximized form.

60. The method of claim 58, further comprising re-determining a position of a table in the queue of tables each time the player enters an action on the table.

61. The method of claim 55, further comprising enabling the player to adjust a position of the queue of tables and the at least one table displayed in the maximized form.

62. The method of claim 55, further comprising displaying a gameplay status of each table in the queue of tables while each table is in the minimized form, wherein the gameplay status includes a plurality of community cards that have been dealt at the table, one or more hold cards that have been dealt to the player, and a betting status of each competitor of the player at the table.

63. The method of claim 41, further comprising displaying at least one advertisement on at least one of the tables during a first period of time but not during a second period of time.

64. The method of claim 63, wherein the first period of time includes a synchronized break period of the tournament and the second period of time includes a period in which the tournament gameplay occurs.

65. The method of claim 41, further comprising issuing a biometric challenge that must be passed for the player to be enabled to play the game.

66. The method of claim 65, further comprising randomly selecting the biometric challenge from a predetermined group of biometric challenges.

67. The method of claim 41, further comprising providing a first plurality of virtual tables within a first virtual poker room and providing a second plurality of virtual tables within a second virtual poker room.

68. The method of claim 67, further comprising crediting a portion of the money received from the gameplay on the tables of the first virtual poker room to an owner or operator of the first virtual poker room, and crediting a portion of the money received from the gameplay on the tables of the second virtual poker room to an owner or operator of the second virtual poker room.

69. The method of claim 68, further comprising providing the first virtual poker room within a first virtual casino and providing the second virtual poker room within a second virtual casino.

70. The method of claim 69, further comprising causing an avatar representative of the player to move from the first virtual casino to the second virtual casino to enable the player to play one or more games within the second virtual casino.

71. The method of claim 70, further comprising enabling the player to operate a virtual reality device to input gameplay commands for playing one or more games at the tables of the first plurality of tables or the second plurality of tables.

72. The method of claim 71, further comprising rendering a virtual field of view of at least one of the first plurality of tables or the second plurality of tables to display the at least one table to the player using the virtual reality device.

73. The method of claim 41, further comprising using a random number generator to generate a plurality of random numbers for use in selecting the cards used in the hands.

74. The method of claim 73, further comprising using a nature-based random number generator to select the random numbers.

75. The method of claim 41, further comprising enabling the player to use a secondary device to control the gameplay of at least one game presented on the gaming device.

76. The method of claim 41, further comprising providing one or more achievements that may be earned by the player to unlock features of the game, wherein achieving a first achievement enables the player to play at least one game on a plurality of tables at the same time.

77. The method of claim 76, further comprising enabling the player to customize aspects of at least one table and to invite other players to play one or more wagering games on the at least one table after a second achievement has been earned.

78. The method of claim 41, further comprising providing a wagering game tournament in which a plurality of players at a plurality of tables are enabled to participate, and controlling a time at which the tournament ends by selecting a required bet amount for each hand.

79. The method of claim 41, further comprising providing a wagering game tournament in which a time bank is assigned to each player representing a total amount of time that the player may act during the wagering game tournament, and removing the player from the wagering game tournament if the player's time bank reaches zero or if an amount of chips that the player has in play during the wagering game tournament reaches zero.

80. The method of claim 79, further comprising redistributing a first player's remaining time in the first player's time bank to at least one other player in the wagering game tournament if the first player's chips reach zero.

81. A system for providing one or more wagering games, said game system comprising:

a game system comprising:

a game server comprising at least one first processor configured to provide at least one wagering game to a player using the at least one gaming device, wherein each wagering game is played by a plurality of players at a virtual table who are dealt a plurality of cards to form a hand, and in which the hand satisfying a winning criterion is determined to be a winning hand; and at least one non-relational database configured to be connected to said game server, said at least one database further configured to store a state of the hands of each table as a plurality of document-oriented datasets, wherein each document-oriented dataset includes a semi-structured encapsulation of data using a non-relational database architecture; and a gaming device configured to connect to said game server over a network, said gaming device comprising at least one second processor configured to enable the player to play the at least one wagering game.

82. The system of claim 81, wherein said at least one non-relational database is further configured to store a state of each table as at least one document-oriented dataset.

83. The system of claim 81, further comprising an authentication token that is used to authenticate said gaming device with said game system.

84. The system of claim 83, wherein said game system is further configured to associate a player identifier, a network socket identifier, and a table identifier with the authentication token.

85. The system of claim 84, wherein said game system is further configured to:

detect that said gaming device has been disconnected from said game system;

detect that said gaming device has been reconnected to said game system after the disconnection; and automatically re-authenticate said gaming device with said game system without requiring the player to input authentication information.

86. The system of claim 85, wherein, upon re-authenticating said gaming device with said game system, said game system is further configured to:

automatically connect said gaming device to a player account associated with the player identifier;

automatically seat an avatar of the player at a table associated with the table identifier; and automatically restore a state of the gameplay at the table.

87. The system of claim 81, further comprising at least one application that is selectable by the player to be displayed on a user interface of said gaming device operated by the player.

88. The system of claim 87, wherein the application may be transferred from said gaming device to another device operated by the player such that the application is displayed on the other device.

89. The system of claim 88, wherein the other device is a mobile device operated by the player.

90. The system of claim 87, wherein the application is a note-taking application that enables the player to rank competitors who are playing against the player at a table.

91. The system of claim 90, wherein the player and each competitor is represented within the game using a respective avatar, and wherein the avatar of each competitor is marked based on the rank selected by the player for each competitor.

92. The system of claim 81, wherein said game server is further configured to enable the player to play the at least one wagering game on a plurality of tables at the same time.

93. The system of claim 92, wherein said game server is further configured to enable the player to play a first wagering game on a first table at the same time that the player plays a second wagering game on a second table, wherein the first wagering game is a different game type than the second wagering game.

94. The system of claim 92, wherein at least some of the plurality of tables are displayed on said gaming device in a minimized form in a queue of tables.

95. The system of claim 94, wherein at least one of the plurality of tables is displayed on said gaming device in a maximized form along with the queue of tables.

96. The system of claim 95, wherein said game system enables the player to enter an action on each table in the queue of tables.

97. The system of claim 96, wherein said game system enables the player to fold a hand on any of the tables in the queue of tables.

98. The system of claim 96, wherein each table in the queue of tables is ordered based on a priority of action required by the player at each table.

99. The system of claim 98, wherein the table with the highest priority is displayed in the queue of tables in the maximized form.

100. The system of claim 98, wherein a position of a table in the queue of tables is re-determined each time the player enters an action on the table.

101. The system of claim 95, wherein each table in the queue of tables displays a gameplay status of the table.

102. The system of claim 101, wherein the gameplay status includes a plurality of community cards that have been dealt at the table, one or more hold cards that have been dealt to the player, and a betting status of each competitor of the player at the table.

103. The system of claim 81, wherein said game system is configured to cause at least one advertisement to be displayed on at least one of the tables during a first period of time but not during a second period of time.

104. The system of claim 103, wherein the first period of time includes a synchronized break period of the tournament, and the second period of time includes a period in which the tournament gameplay occurs.

105. The system of claim 81, wherein said game system issues a biometric challenge that must be passed for the player to be enabled to play the game.

106. The system of claim 105, wherein said game system randomly selects the biometric challenge from a predetermined group of biometric challenges.

107. The system of claim 81, further comprising a first plurality of virtual tables positioned within a first virtual poker room and a second plurality of virtual tables positioned within a second virtual poker room.

108. The system of claim 107, wherein a portion of the money received from the gameplay on the tables of the first virtual poker room is credited to an owner or operator of the first virtual poker room, and a portion of the money received from the gameplay on the tables of the second virtual poker room is credited to an owner or operator of the second virtual poker room.

109. The system of claim 108, wherein the first virtual poker room is provided within a first virtual casino and the second virtual poker room is provided within a second virtual casino.

110. The system of claim 109, wherein the player is enabled to cause an avatar representative of the player to move from the first virtual casino to the second virtual casino to play one or more games within the second virtual casino.

111. The system of claim 110, further comprising a virtual reality device configured to input gameplay commands for playing one or more games at the tables of the first plurality of tables or the second plurality of tables.

112. The system of claim 111, wherein a virtual field of view of at least one table of the first plurality of tables or the second plurality of tables is rendered by said game system to display the at least one table to the player using said virtual reality device.

113. The system of claim 81, further comprising a random number generator configured to generate a plurality of random numbers for use in selecting the cards used in the hands.

114. The system of claim 113, wherein the random number generator uses a nature-based random number generator to select the random numbers.

115. The system of claim 81, wherein said game system enables the player to use a secondary device to control the gameplay of at least one game presented on said gaming device.

116. The system of claim 81, wherein said game system is configured to provide one or more achievements that may be earned by the player to unlock features of the game, wherein at least one of the achievements enables the player to play at least one game on a plurality of tables at the same time.

117. The system of claim 116, wherein at least one of the achievements enables the player to customize aspects of at least one table and to invite other players to play one or more wagering games on the at least one table.

118. The system of claim 81, wherein said game server is configured to provide a wagering game tournament in which a plurality of players at a plurality of tables are enabled to participate, said game server is further configured to select a required bet amount for each hand to control a time at which the tournament ends.

119. The system of claim 81, wherein said game server is configured to provide a wagering game tournament in which a time bank is assigned to each player representing a total amount of time that the player may act during the wagering game tournament, and wherein said game server removes the player from the wagering game tournament if the player's time bank reaches zero or if an amount of chips that the player has in play during the wagering game tournament reaches zero.

120. The system of claim 119, wherein said game server is configured to redistribute a first player's remaining time in the first player's time bank to at least one other player in the wagering game tournament if the first player's chips reach zero.

* * * * *